US009626359B1

(12) United States Patent
Sun

(10) Patent No.: US 9,626,359 B1
(45) Date of Patent: Apr. 18, 2017

(54) DYNAMIC DATA ENCAPSULATING SYSTEMS

(71) Applicant: XASP SECURITY, LLC, Irvine, CA (US)

(72) Inventor: Chig Jong Sun, Irvine, CA (US)

(73) Assignee: XASP SECURITY, LLC

( * ) Notice: Subject to any disclaimer, the term of this patent is extended or adjusted under 35 U.S.C. 154(b) by 0 days.

(21) Appl. No.: 15/152,874

(22) Filed: May 12, 2016

Related U.S. Application Data

(60) Provisional application No. 62/265,341, filed on Dec. 9, 2015.

(51) Int. Cl.
| | | |
|---|---|---|
| *G06F 17/28* | (2006.01) | |
| *G06F 17/30* | (2006.01) | |
| *G06F 9/46* | (2006.01) | |
| *G06F 9/44* | (2006.01) | |

(52) U.S. Cl.
CPC ............ *G06F 17/28* (2013.01); *G06F 9/4443* (2013.01)

(58) Field of Classification Search
CPC ............... G06F 17/28; G06F 17/30861; G06F 17/30899; G06F 17/3089; G06F 17/12; G06F 17/0014; G06F 17/32; G06F 17/323; G06F 17/3232; G06F 17/3241; G06F 17/3281; G06F 9/46; G06F 9/45529; G06F 9/4443
See application file for complete search history.

(56) References Cited

U.S. PATENT DOCUMENTS

| | | | | |
|---|---|---|---|---|
| 7,151,832 B1 * | 12/2006 | Fetkovich | ............ | G06F 21/606 |
| | | | | 348/E7.056 |
| 7,552,172 B2 * | 6/2009 | Corboy | ............ | G06F 17/30899 |
| | | | | 709/203 |
| 8,570,861 B1 | 10/2013 | Brandwine | | |
| 8,892,687 B1 * | 11/2014 | Call | .................. | H04L 29/06972 |
| | | | | 707/756 |
| 8,938,491 B1 | 1/2015 | Colton | | |
| 8,983,061 B2 * | 3/2015 | Watanabe | ........... | H04L 63/0428 |
| | | | | 380/262 |
| 9,106,693 B2 | 8/2015 | Quinlan | | |
| 9,396,279 B1 * | 7/2016 | O'Donnell | .......... | G06F 17/3089 |
| 2004/0030896 A1 | 2/2004 | Sakamura | | |
| 2012/0137210 A1 * | 5/2012 | Dillon | ............... | G06F 17/30902 |
| | | | | 715/234 |
| 2013/0318348 A1 * | 11/2013 | Lebron | ............... | H04L 63/0428 |
| | | | | 713/168 |
| 2014/0298013 A1 | 10/2014 | Knudsen | | |
| 2014/0344705 A1 * | 11/2014 | Dimitrov | .............. | G06F 3/0481 |
| | | | | 715/744 |

(Continued)

*Primary Examiner* — Saket K Daftuar
(74) *Attorney, Agent, or Firm* — Fish & Tsang, LLP

(57) ABSTRACT

A proxy that encapsulates computer code transmitted between a client and a server is disclosed. The proxy encapsulates one portion of the computer code within another portion of computer code, such as encapsulating Javascript within HTML or encapsulating Javascript within VBScript within HTML. The proxy could selects portions of the computer code to encapsulate in accordance with a selective algorithm or a randomizer, and could randomize function names that are executed to produce the encapsulated code. If the proxy detects a response from a client that is malformed, the proxy could trigger appropriate security measures to adjust communication protocols with the client.

8 Claims, 15 Drawing Sheets

(56) References Cited

U.S. PATENT DOCUMENTS

2015/0188926 A1    7/2015  Hom
2015/0339479 A1*  11/2015  Wang .................... G06F 21/556
                                                  726/22
2016/0063267 A1*  3/2016  Dempsey ............ G06F 21/6218
                                                  726/28

* cited by examiner

DYNAMIC DATA ENCAPSULATING SYSTEMS

This application claims the benefit of priority to U.S. provisional application 62/265,341 filed on Dec. 9, 2015. This and all other extrinsic references referenced herein are incorporated by reference in their entirety.

FIELD OF THE INVENTION

The field of the invention is security systems.

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Many publically accessible computer systems are victims of malicious cyber-attacks, for example some malicious users attack computer systems in order to steal confidential data or attack computer systems in order to bring down a server. Preventing malicious data attacks from causing harm to a server is of paramount importance for companies who depend upon providing secure services to their user base at all times. Primitive security systems provide a proxy in front of a computer server which gathers a list of IP addresses of known malicious systems. The proxy will then prevent transmissions from known malicious IP addresses from being transmitted to the protected computer server. Such systems, however, fail to protect computer servers from unknown malicious systems having unknown IP addresses.

U.S. Pat. No. 8,938,491 to Colton teaches a system that dynamically alters the proxy code of client-side JavaScript code at a predetermined time to generate altered proxy codes. The altered proxy codes do not convey the meaning of the function or service so that someone who knows the JavaScript code at one point of time cannot access the same JavaScript code at another point of time. Colton's system, however, always uses the same JavaScript functions for each iteration. An attacker who spoofs an entire function could apply that function at a later time period, even if the server generates a new altered proxy code.

U.S. Pat. No. 8,983,061 to Watanabe teaches a system for encrypting data to provide a security layer between two computer systems. Watanabe's system will choose an encryption algorithm, key, and/or parameter based upon a hash value of a predetermined portion of the data segment. Watanabe's system, however, requires a portion of the data to be transmitted without encryption, which is then hashed to inform the recipient of the encryption algorithm, key, and/or parameter. Watanabe's system also requires both systems to have software code that can generate the hash value to determine which encryption algorithm is chosen. A malicious entity having access to one of the systems could easily spoof that system.

US2014298013 to Marchant teaches a system for dynamically selecting portions of data to encrypt and selecting the type of encryption algorithm to use using a public code and a pin. Marchant's system predictably cycles through a number of bytes to be encrypted/decrypted and the type of encryption algorithm to use based upon the public code and the pin. Marchant's system, however, requires the client system to have code that cycles through the types of encryption algorithms chosen using a pin. A malicious entity having access to the client system could easily spoof the client system.

U.S. Pat. No. 9,106,693 to Quinlan teaches a system that uniquely identifies a device through a fingerprinting technique. Quinlan's fingerprinting technique analyzes characteristics associated with the remote device and compares the fingerprint to the fingerprints of known attackers. Quinlan's system will then selectively manage traffic based upon the determined similarity between the fingerprint of the new device and the fingerprints of known attackers. Quinlan's system, however, can be easily overcome by an attacker that submits false fingerprint data.

US 2015/0188926 to Horn teaches a system that stores reputations of subjects (e.g. person, software) that request access to a controlled resource. Horn's system determines whether the subject is a known security risk, and modifies the reputation of the subject in the case that the security risk meets a threshold. Horn's system, however, administers predictable, predetermined tests to determine whether the subject is a known security risk, which can be easily overcome by an attacker that analyzes Horn's system for a short period of time.

Thus, there remains a need for a system and method that prevents attackers from harming a known system.

SUMMARY OF THE INVENTION

The following description includes information that may be useful in understanding the present invention. It is not an admission that any of the information provided herein is prior art or relevant to the presently claimed invention, or that any publication specifically or implicitly referenced is prior art.

The inventive subject matter provides apparatus, systems, and methods to dynamically encapsulate, or rearrange, the result data that is sent to the client device. In many embodiments, the result data that is transmitted from the server device contains computer code that, when executed on the client device, displays a user interface. For example, the client device could display a visual representation of a website on a monitor when HTML computer code sent by the server device is executed by the client device's browser. The proxy could select portions of the original computer code from the server device for encapsulation to hide or rearrange within an obfuscating computer code, for example JavaScript. The proxy could then transmit the obfuscating computer code to the client device such that the client device first executes the obfuscating computer code to reconstruct the original computer code, and then executes the original computer code to present a user interface to the client device. In the example above, where the server device transmits HTML code to the proxy, the proxy could hide portions of the HTML within JavaScript code. When the JavaScript code is executed by the browser of the client device, the JavaScript code could reconstruct the hidden portions of the HTML code for execution by the client device.

In some embodiments, the obfuscating computer code could be used as the restorative code for an encryption cipher that is split into component parts and is hidden in a distributed fashion in the response from the proxy device. The encryption cipher could then be used by the client device to encrypt inputs received by the client device and then sent to the proxy in a later transmission.

BRIEF DESCRIPTION OF THE DRAWING

FIGS. 9A-C shows exemplary computer code that is altered by a proxy before being sent to a client device.

BRIEF DESCRIPTION OF THE DRAWING

Figure 1:
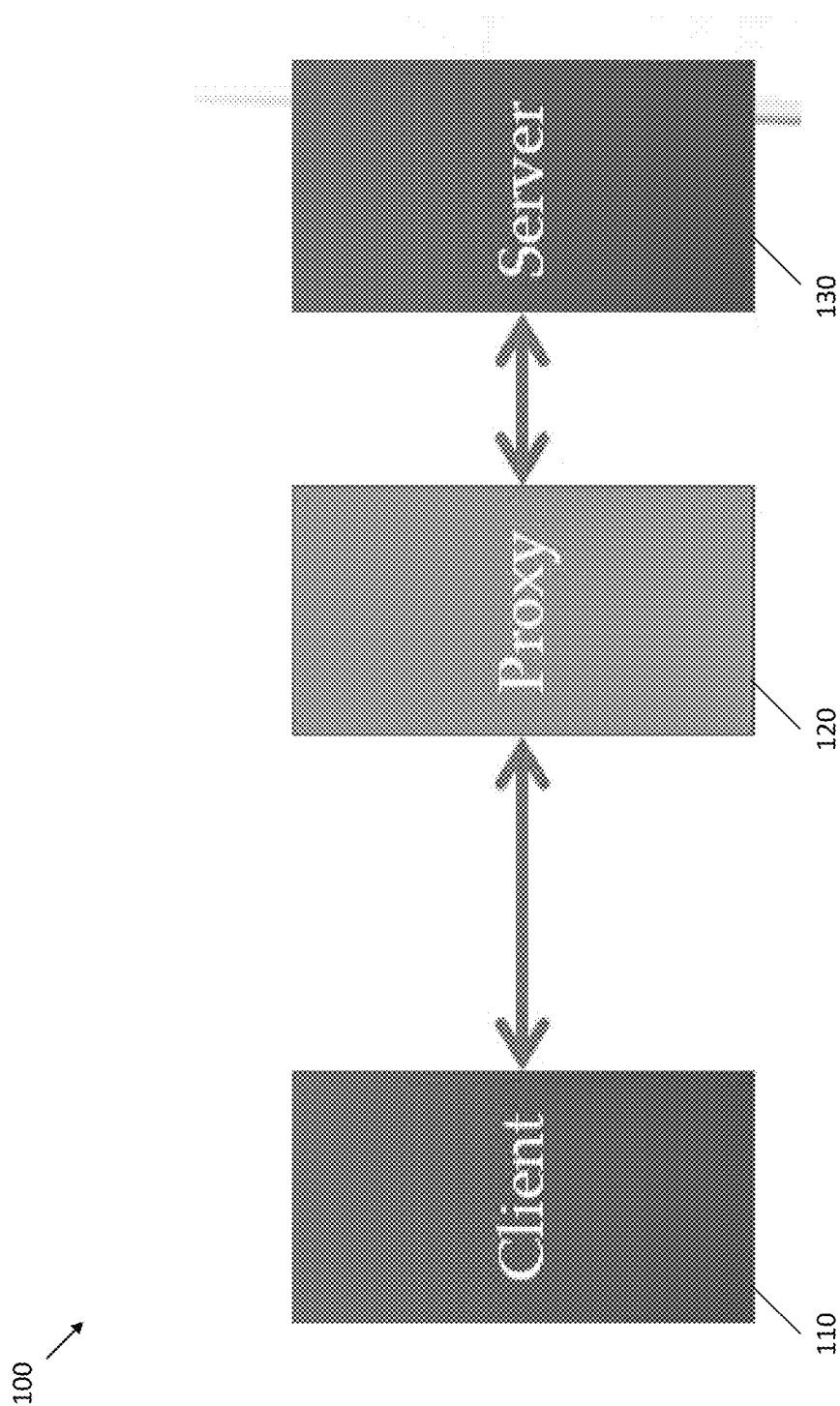
FIG. 1 shows an example of a network architecture of a proxy system.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, engine, or a module is described as configured to perform a set of functions, the meaning of "configured to" or "programmed to" is defined as one or more processors being programmed by a set of software instructions to perform the set of functions.

One should appreciate that the disclosed server security systems and methods provide numerous advantageous technical effects. For example, the server security systems and methods provides additional layers of security for web servers without changing the architecture of the web server, that is, the proxy that provides the additional layers of security is seamless and transparent to the web server.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Two electronic devices that are "functionally coupled" to one another are generally connected to one another through an electronic network that allows data to be transmitted from one electronic device to another.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The inventive subject matter provides apparatus, systems, and methods to protect a server device via a proxy that controls traffic between the server device and client devices accessing the server device.

FIG. 1 shows a hardware architecture 100 of a client device 110 communicatively coupled with a server device 130 through proxy device 120. Proxy device 120 acts as an intermediary, controlling traffic between one or more client devices, such as client device 110, and a server device, such as server device 130. Proxy device 120 is generally configured to detect whether client device 110 is exhibiting symptoms indicative of malicious behavior and react accordingly to minimize the effects of the potential malicious behavior. Based upon the behavior of the client device, proxy device 120 can assign client device 110 a measurable metric that indicates the likelihood that the client device is a malicious device. When the measurable metric is over a given threshold, the proxy could slow down, throttle, or even cut off, traffic between the aforementioned client device and the server device. In some embodiments, the amount of bandwidth made available to client device 110 could be set as a function of one or more measurable metrics detected by proxy device 120. For example, where the measureable metric is above a first threshold (e.g. 70% chance that the client device is a malicious device) proxy device 120 could cut off traffic between server device 130 and client device 110 for a period of time (such as a week or a month). Such time periods could be set by an administrator user through an admin user interface functionally coupled to the proxy device. Where the measurable metric is above a second threshold (e.g. 50% chance that the client device is a malicious device) proxy device 120 could throttle traffic (e.g. 20% normal speeds) between server device 130 and client device 110 for a period of time. In other embodiments, any time proxy device 120 detects malicious behavior, proxy device 120 will trigger a throttling of traffic, a trap for a malicious client, or even cutting off traffic between the server device and the client device.

As used herein, client device 110, server device 130, and proxy device 120 could each be discrete computer systems having one or more computer chassis, processors and memories with computer code that, when executed by the processor(s) performs the functions disclosed herein. Client device 110, server device 130, and proxy device 120 could all communicate with one another via a networked connection, such as an intranet or the Internet, and need not be local to one another. In other embodiments, a software proxy could be installed upon server device 130, which means that the functionality of both the proxy and the server are performed on the same system. Preferably, the functionality of the proxy is transparent to both the functionality of server device 130 and client device 110 such that little to no modification of any software or hardware is necessary to insert the proxy functionality between client device 110 and server device 120.

Figure 2:
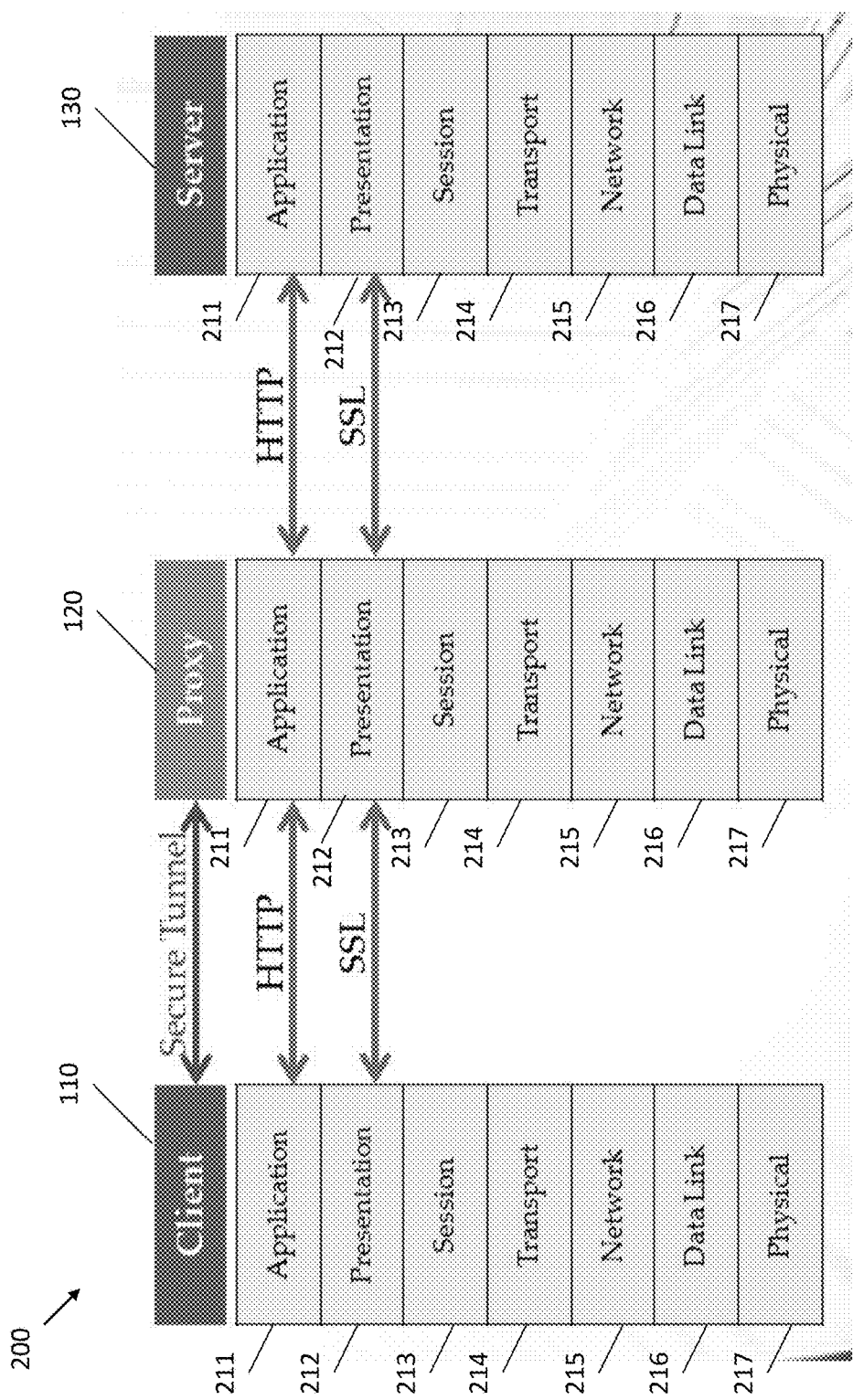
FIG. 2 shows the layers involved in an exemplary embodiment of the proxy system of FIG. 1.

FIG. 2 shows a logical schematic 200 of client device 110, proxy device 120, and server device 130. While proxy device 120 could communicate with server device 130 or client device 110 via lower layers, such as the session or transport layers, preferably the proxy communicates with the client device through a secure tunnel via the application and/or presentation layers of the network (through an HTTP or an SSL interface, respectively). Generally, client device 110 communicates with proxy device 120 via presentation layer 212, such as a secure sockets later (SSL) using an application via application layer 211, such as a browser communicating via the hypertext transfer protocol (HTTP), hypertext preprocessor (PHP), active server pages (ASP), and/or java server pages (JSP). Client device 110 treats proxy device 120 just like any other browser, sending and receiving various requests from proxy device 120 using one or more security protocols. If proxy device 120 determines that commands from client device 110 are "safe," then proxy device 120 will then forward those commands to server device 130 via its own browser-based SSL connections with server device 130. Proxy device 120 would then receive a response from server device 130, which could then be packaged and sent to client device 110 via any application-recognizable script.

Figure 3:
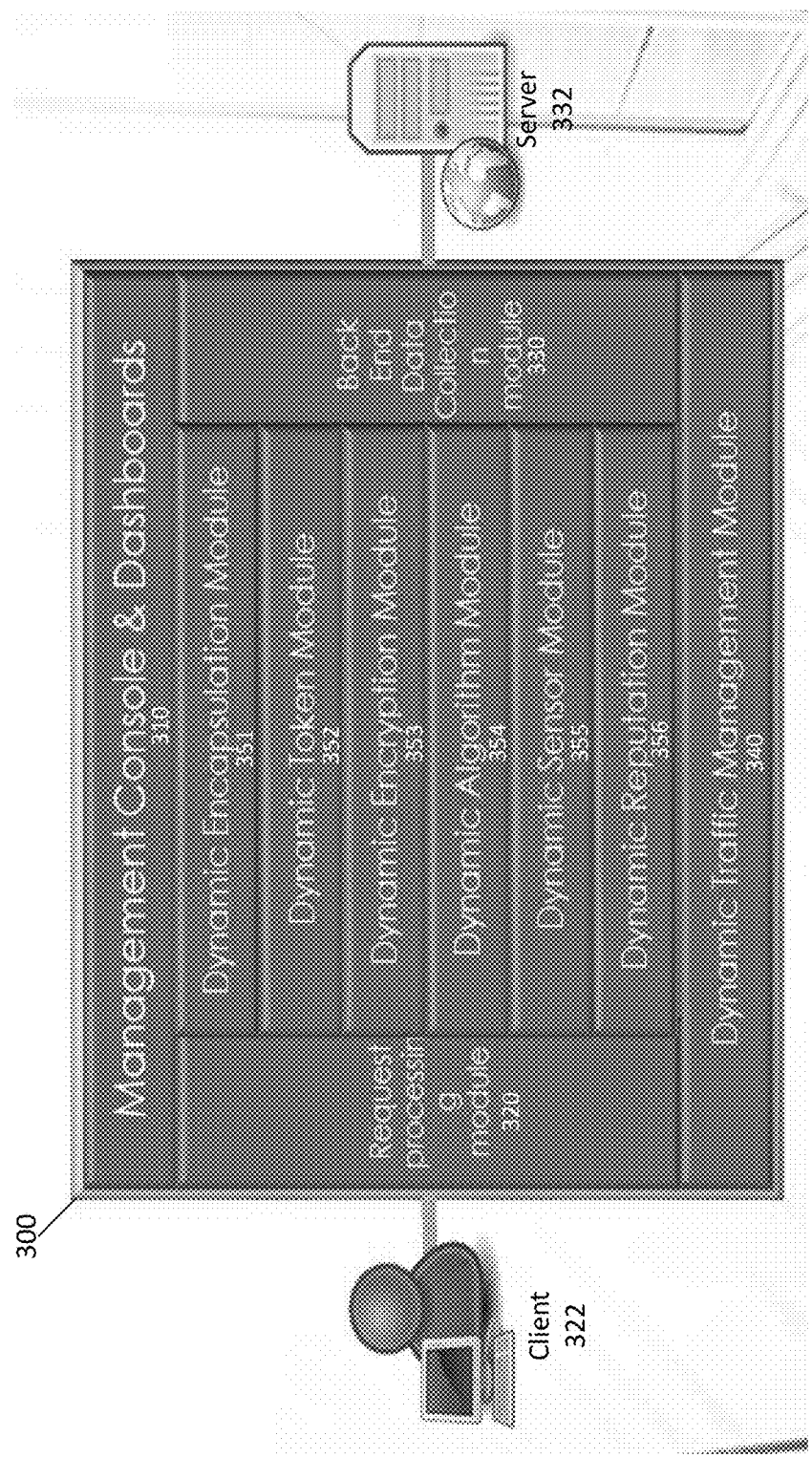
FIG. 3 shows a software schematic of an exemplary proxy.

FIG. 3 shows a software schematic of an exemplary proxy 300 with a client device 322 communicating with proxy 300 via a request processing module 320, and the server device 332 communicating with proxy 300 via a back end data collection module 330. When client device 322 sends a request for data to server device 332, request processing module 320 receives the request and processes the request via one or more of the proxy detection modules 351, 352, 353, 354, 355, and/or 356, depending upon how an administrative user has configured proxy 300. In the current example, the modules of proxy 300 that process the request are the dynamic encapsulation module 351 (to encapsulate data from the client device and/or server device within a different format), dynamic token module 352 (to exchange tokens with which to validate a communication from a client device and/or server device), dynamic encryption module 353 (to encrypt data from the client device and/or server device), dynamic algorithm module 354 (to select an algorithm for use with the client device and/or server device), dynamic sensor module 355 (to collect information from a client device), and dynamic reputation module 356 (to assign a measurable reputation metric to a client device). Different combinations of modules, or even other modules could be used in embodiments of proxy devices without departing from the scope of the current invention. For example, a dynamic forensic module (not shown, to detect behaviors of a user of a client device), could also communicate with request processing module 320 and the back end data collection module 330. When one or more of the modules detects that client data received by request processing module 320 is indicative of a malicious client, an alert could be triggered that indicates that the received client data could be malicious. In some embodiments, the alert could trigger an immediate action, such as preventing data from being transmitted from the client device to the server device, throttling data transmitted between the client device and the server device, placing an identifier of the client device (e.g. an IP address or a computer name) in a "black list" of client devices that are not allowed to transmit information to the server device, placing an identifier of the client device in a "grey list" of client devices that are monitored more heavily than other client devices, and/or increasing a measurable metric that indicates the likelihood that the client device is a malicious device. In some embodiments, each alert could increment the measurable metric by a predetermined amount.

Management console & dashboards module 310 provide a user interface through which an administrator user could configure the various modules and reactions to alerts. In some embodiments, management console & dashboards module 310 is configured to be accessed through a user interface terminal coupled directly to the proxy device having the proxy installed on a non-transient computer-readable medium of the proxy device, while in other embodiments management console & dashboards 310 is accessed through a remote terminal that is functionally coupled to the proxy device via a network connection.

Through management console & dashboards module 310, an admin user could activate or deactivate each of the proxy detection modules, could alter attributes of what the proxy detection modules encrypt, could add/remove algorithms used by the proxy detection modules, could adjust properties of randomizers used by the proxy detection modules, and could manually add/remove client identifiers from databases (not shown) used by any of the proxy detection modules having black, grey, or white lists of client devices. Any databases used by the proxy detection modules could be installed on a proxy device itself, or could be configured to be accessed by the proxy device via a functionally coupled network interface.

Dynamic traffic management module 340 receives the triggered alerts and adjusts traffic accordingly in accordance with administrator settings and the triggered actions of one or more of the proxy detection modules. For example, if the proxy detection modules indicate that client device 322 has a malicious behavior indicator above a first threshold (e.g. a 50% threshold), dynamic traffic management module 340 could throttle traffic between client device 322 and server device 332 by a calculated amount (e.g. halved or quartered) for a period of time. Alternatively, if one the proxy detection modules indicate that client device 322 has a malicious behavior indicator above a second threshold (e.g. an 80% threshold), dynamic traffic management module 340 could completely block traffic between client device 322 and server device 332 for a period of time. Proxy 300 could be configured such that it places an identifier (e.g. an IP address, MAC address, or a computer name) of a repeat-offender (e.g. a device whose malicious behavior indicator remains above 50% for over two hours) be placed on a "blacklist" such that, when proxy 300 recognizes an identifier of the repeat-offender in a new incoming request from a client device, the repeat-offender will have all of its traffic completely blocked by dynamic traffic management module 340. Dynamic traffic management module 340 could also be configured to detect and filter out "abnormal" or "malicious" packets against attacks that are under Layer 7. As used herein, an "abnormal" packet is one that fails to fall within a certain threshold of a client device signature and/or a user signature created by the system (for example a dynamic forensic module). As used herein, a "malicious" packet is a packet that is identified by the system by detecting a malicious signature within the packet (for example, a signature of a known malicious software, such as a virus or a pattern indicative of a type of attack, such as a DDoS attack).

Figure 4:
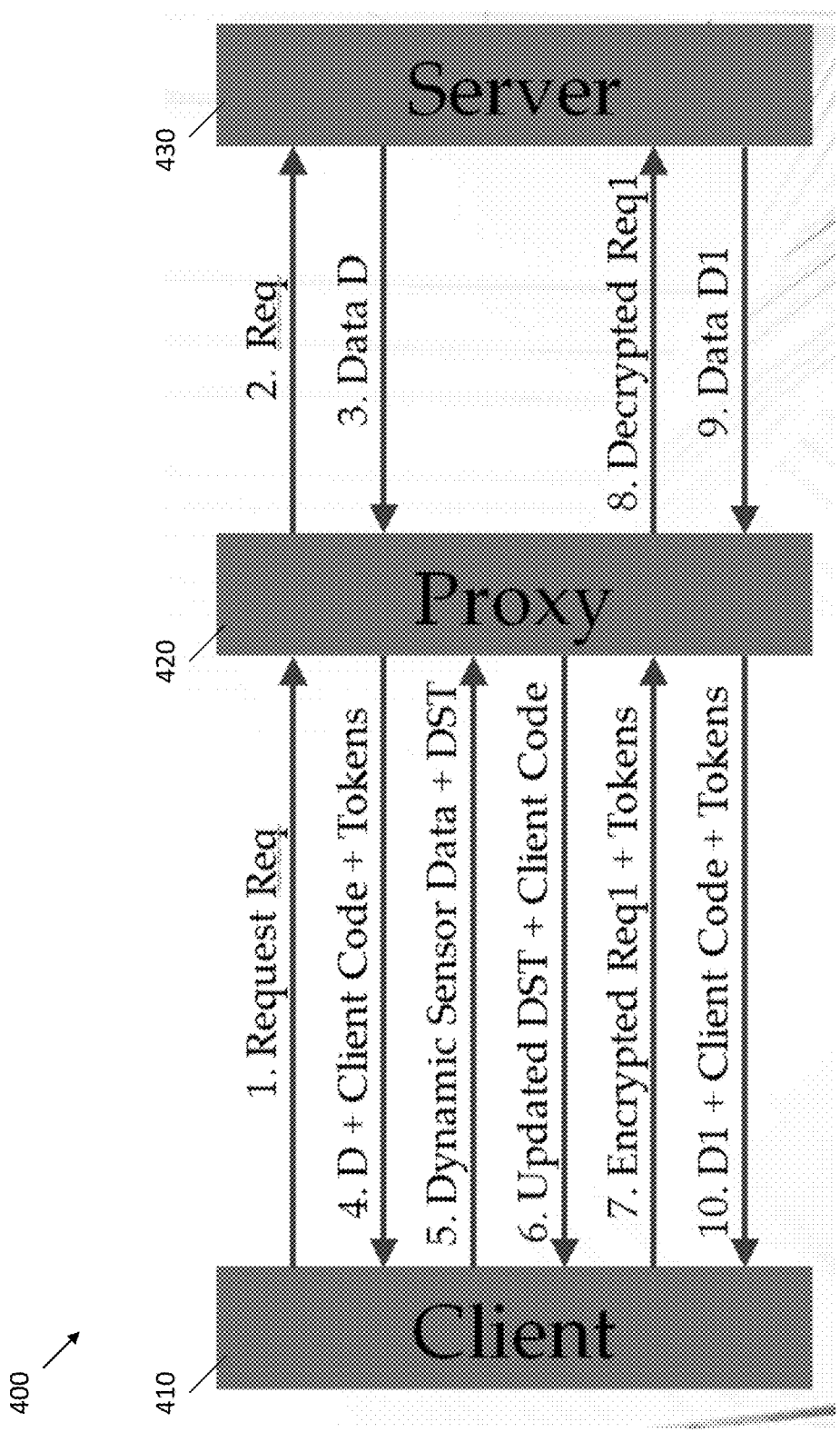
FIG. 4 shows an exemplary method for a security system of the present invention.

FIG. 4 shows an exemplary method 400 of traffic forwarded between a client device 410, a proxy device 420, and a server device 430. As shown, when client device 410 communicates with server device 430 via proxy device 420, proxy device 420 receives requests for information from client device 410, passes the requests for information to server device 430, and server device 430 then returns data D to proxy device to be sent to client device 410. Here, proxy device 410 initially receives a request "Req" from client device 410 in step 1. Proxy device 410 could analyze the initial request "Req" for attributes which might trigger an alert (e.g. the initial request is sent through an inappropriate url, the client device is identified as a "blacklist" device, the initial request "Req" contains a malicious signature) and could forward the request "Req" to server device 430 if an alert is not triggered by proxy device 420. Server device 430 receives request "Req" from proxy device 420 in step 2 and, in response to request "Req," returns data D to proxy device 420 in step 3. At a later time, server device 430 receives decrypted request "Req1" at step 8, and returns data D1 to the proxy device in step 9. In each instance proxy device 420 preferably communicates in a simple manner with server device 430 by sending requests for data to server device 430 and by receiving data results from server device 430.

While communication between proxy device 420 and server device 430 remains simplistic, the communication between proxy device 420 and client device 410 can be configured to be more complex to ensure that malicious attacks blocked by proxy device 420. Here, between the time proxy device 420 transmits data D to client device 410 and client device 410's transmission of a second "Req1" to server device 430, proxy device 420 could be configured to communicate with the client device several times to determine the likelihood that the client device is malicious.

Proxy device 420 could protect server device 430 in a plurality of different ways by utilizing its separate pipeline with client device 410 to check and re-check communications stemming from client device 410. For example, proxy device 420 could ensure that client device 410 dynamically encrypts the data that it sends in accordance with instructions from a dynamic encryption module of proxy device 420, proxy device 420 could dynamically replace and/or encapsulate software code sent to client device 410 using a dynamic encapsulation module, proxy device 420 could dynamically poll environment data specific to client device 410 with a dynamic sensor module, proxy device 420 could profile various client devices to detect malicious behavior patterns using a dynamic reputation module, and/or proxy device 420 could provide verification tokens to client devices that need to use the verification tokens in various ways with a dynamic token module.

In some embodiments, proxy device 420 could verify tokens received from client device 410. In some embodiments, a token sent to client device 410 is configured such that client device 410 is unable to access the content of the token. (e.g. the server device encrypts the token with an algorithm unknown to the client device). Preferably, the system is configured such that client device 410 only stores tokens sent to it by proxy device 420, and returns the tokens to proxy device 420 with its next transmission so that proxy device 420 can determine that it is still communicating with the same client device 410 (e.g. client device 410 has not been "spoofed"). In some embodiments, the token could be configured to contain metadata regarding proxy device 420's communication with client device 410—for example the token could include the type of algorithm client device 410 is instructed to encrypt the communication with or a list of the set of client data that was requested by proxy device 420's dynamic sensor module. Each of the verification steps are preferably dynamic and variable in a pattern only known to proxy device 420 to prevent malicious attackers from anticipating the verification steps. Further details of how the various modules operate are set forth in the following paragraphs.

Dynamic Encryption Methods

Figure 5:
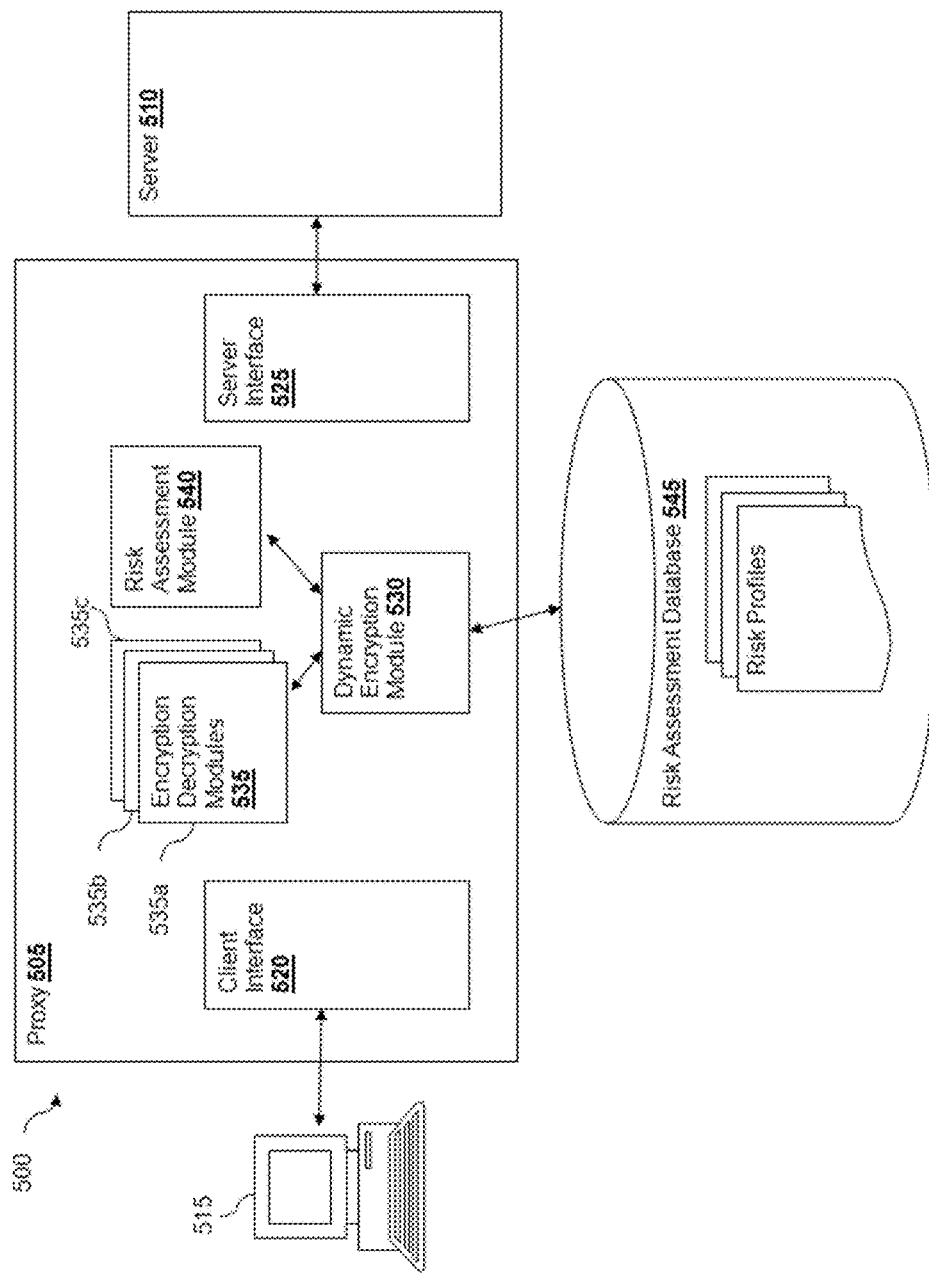
FIG. 5 shows an exemplary proxy configured to employ dynamic encryption methods.

In some embodiments, the proxy could dynamically encrypt data that is sent to and/or from the client device. FIG. 5 illustrates an environment 500 in which a proxy 505 of some embodiments can be operated. The environment 500 is similar to the environment 100, and includes the proxy 505, a server 510, and a client device 515. Proxy 505 includes a client interface 520 for communication with the client device 515, a server interface 525, a dynamic encryption module 530, multiple encryption/decryption modules 535, and a risk assessment module 540. The proxy 505 is communicatively coupled with the client device 515 and the server 510 either locally or over a network (e.g., an intranet, the Internet, etc.). Additionally, the proxy 505 is also communicatively coupled with a risk assessment database 545.

In some embodiments, the risk assessment database 545 stores information associated with different client devices, such as identifiers that can uniquely identify the client devices, and risk profiles associated with the client devices. For example, the risk assessment database 545 could store an identifier for the client device 515 and a risk profile associated with that client device 515. Initially, before the proxy 505 receives requests from any client devices, the risk assessment database 545 could be empty. As client devices, such as the client device 515, begins to make requests to the server 510 via the proxy 505, the proxy 505 slowly builds up different risk profiles for different client devices, that could be used to determine security measures against these client devices.

In preferred embodiments, the proxy 505 is programmed to encrypt data that is sent from the server device to the client device, and send commands for the client device to encrypt data sent from the client device to the server device. When the dynamic encryption module 530 receives a new request from the client device 515 via the client interface 520, the dynamic encryption module 530 is programmed to first check whether the risk assessment database 545 has a risk profile for the client device 515. Typically, the request from the client device 515 would include an identifier (e.g., IP address, MAC address, browser identifier, etc.) that uniquely identifies the client device 515. As mentioned before, this first request from the client device 515 could be encrypted using a simple algorithm, such as an https SSL/TLS encryption layer, the initial request for data is typically sent unencrypted to the proxy 505, since the client device 515 has not yet had any communications with the proxy 505.

If a risk profile for the client device 515 exists in the risk assessment database 545, the dynamic encryption module 530 is programmed to either apply a security policy to the client device 515 based on the risk profile associated with the client device 515, or forward the risk profile to the server 510. In both cases, the dynamic encryption module 530 is programmed to forward the request to the server 510 via the server interface 525.

It can be advantageous for the proxy 505 to be programmed to allow this initial unencrypted traffic to be sent to the server device 510, because the server device 510 receive payment based upon the number of different client devices that access the server device 510. A proxy that blocks all suspect traffic could drastically reduce the number of counted client devices accessing the server device 510. In some embodiments, the proxy 505 is programmed to block all unencrypted initial requests that are not targeted to an assigned entry location (e.g. an entry URL). The proxy 505 of some embodiments is also programmed to verify the correctness of the unencrypted initial request before that initial request is forwarded to the server device 510.

Typically, the server 510 would send data back to the proxy 505 in response to the request. Instead of directly send the data back to the client device 515, the proxy 505 of some embodiments is programmed to use a dynamically encryption scheme for all subsequent communication with the client device 515 in this session.

As mentioned above, the proxy 505 includes multiple encryption decryption modules 535. Each of these encryption decryption modules 535 is programmed to encrypt data using a distinct encryption algorithm, and decrypt data using a decryption algorithm that corresponds to the encryption algorithm. The list of encryption algorithms could comprise any known symmetric and/or asymmetric encryption algorithms without departing from the scope of the invention.

Some algorithms have operators that can be switched with other operators without hurting the integrity of the algorithm (e.g. an addition operation could be replaced with a subtraction operation, a division operation could be replaced with a multiplication operation, or an addition operation could be replaced by a multiplication operation). Some algorithms have sections of code that can be swapped with one another (e.g. swap a and b, "x=a, a=b, and b=x" "a=a xorb, b=a xorb, a=a xor b"). In such embodiments, the proxy 505 is programmed to further modify an operation of the encryption algorithm with any comparable compatible operation. Preferably, the operation is also selected using a randomizer.

Preferably, the proxy 505 includes sufficiently large number of encryption decryption modules 535 (e.g., more than 10, more than 20, more than 50, more than 100, etc.) to provide a variety of different encryption/decryption algorithms to choose from, so that the chance of using the same encryption/decryption algorithm in the same session with the client device 515 is minimal.

In some embodiments, the dynamic encryption module 530 is programmed to select an encryption decryption module out of the many encryption decryption modules 535. Preferably, the dynamic encryption module 530 is programmed to select one of the encryption decryption modules 535 randomly (e.g., by using a randomizer, etc.). In some embodiments, the randomizer could use a plurality of random sources to seed its randomized selection module. The dynamic encryption module 530 is programmed to then send the data received from the server 510 to the selected encryption decryption module (e.g., encryption decryption module 535a for encrypting the data to generate encrypted data. Preferably, the selected encryption algorithm is tied to a specific client device, allowing the proxy 505 to communicate with one client device using one encryption algorithm, and another client device using another encryption algorithm.

Once the data is encrypted by the selected encryption decryption module 535a, the dynamic encryption module 530 is programmed to send the encrypted data, a small software program (e.g., a plug-in, an applet, etc.) that is used to be the liaison in the communication with the proxy 505, and also information associated with the selected encryption decryption module 535a to the client device 515. The information associated with the selected encryption decryption module 535a includes executable software instructions for encrypting and decryption data using the encryption/decryption algorithms corresponding to the selected encryption decryption module 535a, and one or more keys for encryption and/or decryption data using such an encryption/decryption algorithms. Preferably, the dynamic encryption module 530 is programmed to send the encrypted data and the information associated with the selected encryption and decryption module 535a separately.

In some embodiments, the dynamic encryption module 530 is programmed to send the information associated with the encryption decryption module 535a as an obfuscated string containing an encryption key. As used herein, a "string containing an encryption key" comprises a string that represents a set of instructions for a computer device to follow in order to encrypt data to be sent. The obfuscated string could be further split into a plurality of segments in the response message sent to the client device to make it more difficult for an automated bot to mimic. A restorative code is also preferably sent with the plurality of segments that, when executed by the client device, restores the cipher string so that it can be used by the client device in encrypting its next request to the proxy. Exemplary restorative code could be written in any suitable programming language, such as JavaScript, Visual Basic, C#, and C++. Preferably, the restorative code is operating system agnostic, so that it can be run on a plurality of different types of operating systems.

In addition, the dynamic encryption module 530 is programmed to embed the information associated with the selected encryption decryption module 535a in an encrypted token and send the encrypted token to the client device 515. The information can be the encryption/decryption algorithm itself, or an identifier that uniquely identifies the selected encryption decryption module 535a. The encrypted token will be used by the proxy 505 in subsequent communication with the client device 515 to assess the client device 505's risk level.

In preferred embodiments, the dynamic encryption module 530 is programmed to encrypt the token using an encryption algorithm (or key) that is different from any encryption algorithm associated with the encryption decryption modules 535. The purpose of sending this encrypted token to the client device 515 is to verify the integrity of the client device 515 when the proxy 505 receives requests along with the encrypted token from the client device 515 in subsequent communication. In this manner, the proxy 505 also does not need to keep the association of the selected algorithm and the client device 515 in memory. This is particularly useful when the proxy 505 is programmed to communicate with thousands, or hundreds of thousands, of client devices.

The small software program that is being executed at the client device 515 is programmed to encrypt data that the client device 515 desires to send to the server 510 and then forward the encrypted data to the proxy 505, using the encryption algorithm stored in the embedded token. That small software program is also programmed to decrypt all subsequent incoming encrypted data from the proxy 505, and then pass the decrypted data to the client device 515.

The proxy 505 is programmed to also perform subsequent communications with the client device 515 using the selected encryption decryption module 535a. When the client device 515 sent over another request (the request typical will also include the encrypted token), the dynamic encryption module 530 is programmed to use the selected encryption decryption module 535a (embedded in the token) to decrypt the incoming request and forward the decrypted request to the server 510. Additionally, the dynamic encryption module 530 is programmed to also use the selected encryption decryption module 535a to encrypt any outgoing data that the server 510 wants to send to the client device 515, and then forward the encrypted data to the client device 515.

Once an encryption algorithm has been selected, the encryption algorithm is preferably removed from the list of available encryption algorithms for that client device for a period of time. For example, the proxy 505 could be programmed to remove the encryption decryption module 535a associated with the selected encryption algorithm from the list of available encryption algorithms for that client device 515, and add it back to the list of available algorithms after 5 minutes, 10 minutes, 30 minutes, 1 hour, 2 hours, or more have passed. This type of "forced randomness" ensures that the same encryption algorithm won't be used soon after it has been selected. Preferably, the proxy 505 has a list of variations that numbers over 1000, 10000, or even a million, such that the possibility of using the same algorithm twice in a row is low. For example, AES has over $10^{37}$ variations, which does not need such forced randomness.

Preferably, the dynamic encryption module 530 is programmed to dynamically change the encryption/decryption algorithms that are used to encrypt and decrypt data passing between the server 510 and the client device 515 over time (during the same session). In some embodiments, the dynamic encryption module 530 is programmed to change the encryption/decryption algorithm used in the communication with the client device 515 by selecting a different encryption decryption module (e.g., encryption decryption module 535b) from the multiple encryption decryption modules 535 in the proxy 505. The change of encryption/decryption algorithm used in the communication between the proxy 505 and the client device 515 can be triggered by one or more of many variables, including but not limited to, time (e.g., every milliseconds or picoseconds, every minute, every 5 minutes, 10 minutes, 20 minutes, 30 minutes, 1 hour, two hours, etc.) and a number of data transfers between the proxy 505 and the client device 515. For example, the dynamic encryption module 530 is programmed to change an encryption decryption algorithm every five seconds and/or every three data transfers between the proxy 505 and the client device 515.

Upon detecting such a pre-determined trigger, the dynamic encryption module 530 is programmed to select a different encryption decryption module (e.g., encryption decryption module 535b), and transmit information about the encryption decryption module 535b (e.g., executable software code for the encryption and decryption algorithm, keys for the encryption and decryption algorithms, etc.) to the client device 515 via the client interface 520. In some embodiments, the dynamic encryption module 530 is programmed to embed the information associated with the selected encryption decryption module 535b in an encrypted token and send the encrypted token to the client device 515, as described above.

Similar to the process above, once the dynamic encryption module 530 sends the information about the encryption decryption module 535b, the proxy 505 and the client device 515 are programmed to encrypt data to be sent to the other side using the encryption algorithm associated with the encryption decryption module 535b, and decrypt received data using the decryption algorithm associated with the encryption decryption module 535b.

If the proxy 505 receives a subsequent request from the client device 515 that is not encrypted, or that is encrypted with a different algorithm than the selected algorithm indicated by the encrypted token received along with the request, or that the request does not include an encrypted token, then the proxy 505 could detect that the subsequent request was probably not sent by the client device 515 or that the client device 515 is not trustworthy, which can trigger an alert.

In some embodiments, the proxy 505 is programmed to increase a malicious behavior indicator attributes in the risk profile associated with the client device 515 based on the alert, while in other embodiments the proxy 505 is programmed to throttle or completely cut off traffic between the client device 515 and the server device 510 based on the alert. In some embodiments, the proxy 505 might not even trigger an alert, and is programmed to just transmit the malformed request (malformed with the selected encryption algorithm) to the server device 510, which will reject the request as being malformed. In other embodiments, the proxy 505 is programmed to wait for a properly formed request, or send a transmission to the client device to re-send the data, instead of throwing out the malformed request.

Figure 6:
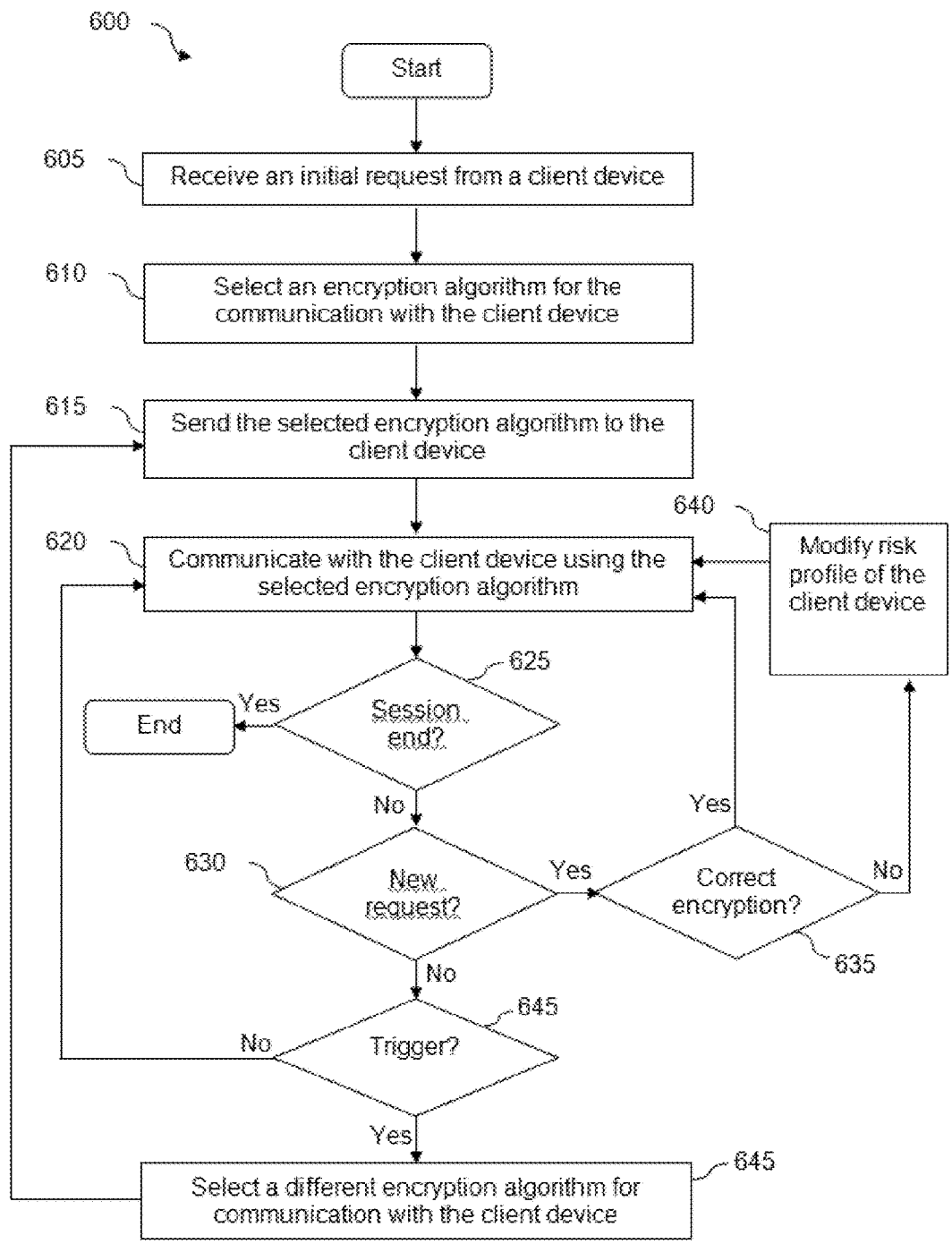
FIG. 6 illustrates a process to employ dynamic encryption methods.

FIG. 6 illustrates a process 600 of the data communication method of some embodiments. In some embodiments, the process 600 is performed by the proxy 505 that acts as the gatekeeper for all data and request directed at a server device (e.g., the server device 510). The process 600 begins by receiving (at step 605) an initial request from a client device (e.g., the client device 515). The initial request is a request for data directed at the server device 510.

The process 600 then selects (at step 610) selects an encryption algorithm for communicating with the client device, and also sends (at step 615) the selected encryption algorithm to the client device. After sending the selected encryption algorithm to the client device, the process 600 begins to communicate (at step 620) with the client device using the selected encryption algorithm.

The process 600 then determines (at step 625) if the session ends. The process 600 can determine this based on a number of factors, such as idling time, whether the client device 515 terminates a session, or the risk profile of the client device determines that the proxy 505 should terminate the session. If it is determined that the session is terminated, the process 600 ends. On the other hand, if it is determined that the session is not terminated yet, the process 600 then determines (at step 630) if a new request is received from the client device 515.

If a new request is received from the client device 515, the process 600 determines (at step 635) whether the encryption algorithm used to encrypt the new request is the same encryption algorithm selected for the client device at step 610. If it is determined that the encryption algorithm used to encrypt the new request is different from the encryption algorithm selected at step 610 (or no encryption was used), the process 600 modifies (at step 640) the risk profile associated with the client device 515 and then go back to step 620 to continue to communicate with the client device according to the modified risk profile.

On the other hand, if it is determined that the new request was encrypted using the same encryption algorithm selected at step 610, the process 600 goes back to step 620 to continue to communicate with the client device using the selected encryption algorithm.

If there is no new request from the client device is detected, the process 600 determines (at step 645) whether an algorithm change is triggered. As mentioned above the algorithm change can be triggered by time or number of data transfer between the proxy 505 and the client device 515. If it is determined that an algorithm change is not triggered, the process 600 goes back to step 620 to continue to communicate with the client device using the selected encryption algorithm. On the other hand, if it is determined that an algorithm change is triggered, the process 600 selects (at step 645) a different encryption algorithm for communication with the client device, and then returns to step 615.

Dynamic Data Encapsulation

Figure 7:
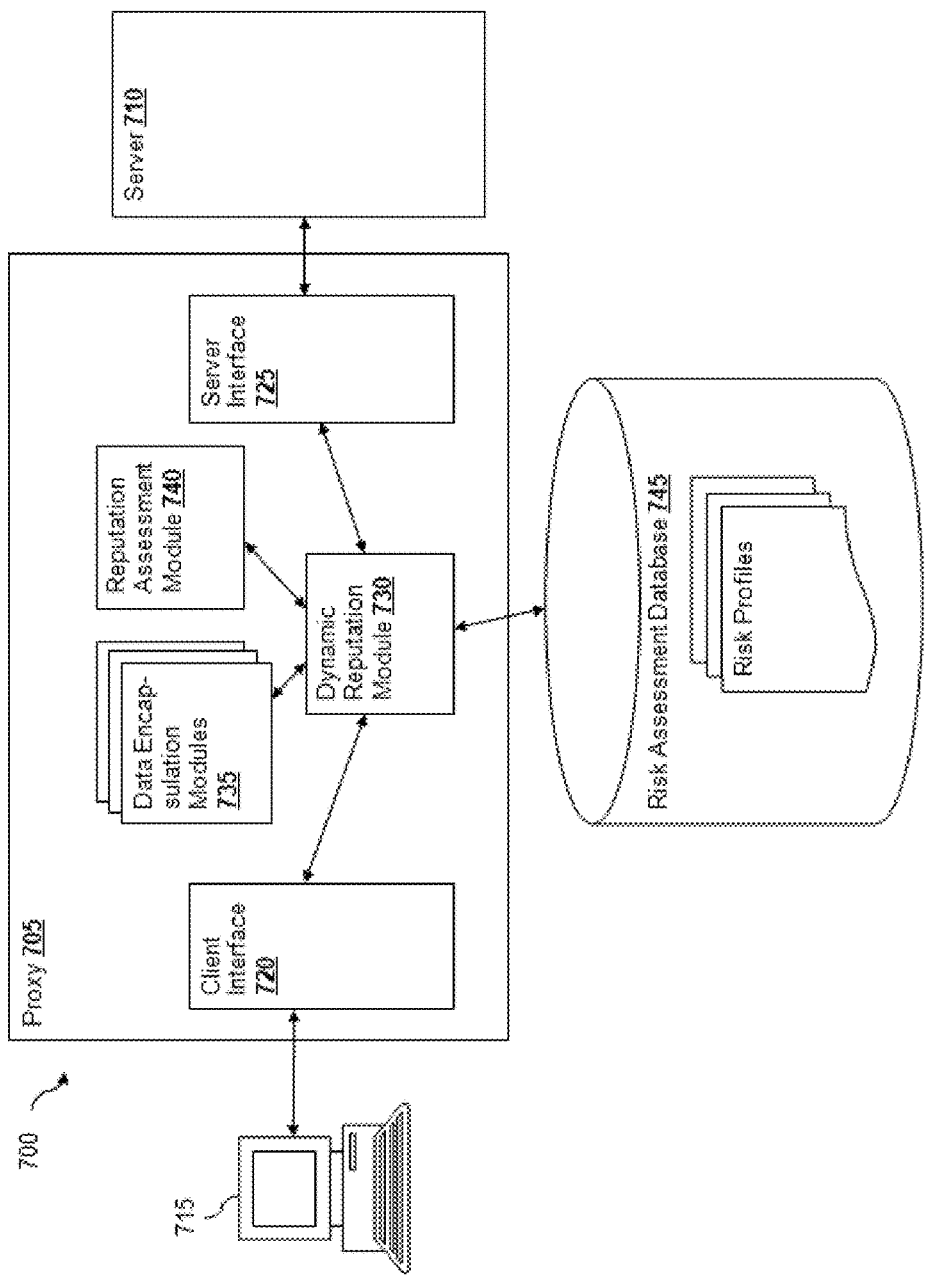
FIG. 7 shows an exemplary proxy configured to employ dynamic data encapsulation methods.

FIG. 7 shows a schematic 700 having a client device 715 communicating with a server 710 via data encapsulation proxy 705. Proxy 705 acts as a gateway for server device 710 against any traffic and communications between server device 710 and any client devices wishing to communicate with server device 710, such as client device 715. Proxy 705 is communicatively coupled with client device 715, which desires to exchange data with server device 710.

The proxy 705 includes a client interface 720 for communication with the client device 715, a server interface 725, a dynamic reputation module 730, data encapsulation modules 735, and a reputation assessment module 740. The proxy 705 is communicatively coupled with the client device 515 and the server 510 either locally or over a network (e.g., an intranet, the Internet, etc.). Additionally, the proxy 505 is also communicatively coupled with a risk assessment database 545.

In some embodiments, the risk assessment database 745 stores information associated with different client devices, such as identifiers that can uniquely identify the client devices, and risk profiles associated with the client devices. For example, the risk assessment database 745 could store an identifier for the client device 715 and a risk profile associated with that client device 715. Initially, before the proxy 705 receives requests from any client devices, the risk assessment database 745 could be empty. As client devices, such as the client device 715, begins to make requests to the server 710 via the proxy 705, the proxy 705 slowly builds up different risk profiles for different client devices that could be used to determine security measures against these client devices.

When client device 715 sends data requests to server 710, server 710 will typically respond by sending computer source code to client device 715, typically in the form of browser compilable code, such as HTML code. Each of the data encapsulation modules 735 (e.g., data verification module 735a, data verification module 735b, etc.) corresponds to a different portion of computer source code sent from server device 710 to client device 715 which needs to be encapsulated. Such portions are termed critical source code, and are typically encapsulated by one or more of the data encapsulation modules 735. An admin user interface (not shown) could e provided to allow an admin user to identify algorithms to automatically identify critical source code and encapsulate that critical source code in a format appropriate for the admin user.

For example, the admin user could designate all input forms to be critical source code, which should be encapsulated in a second computer source code language, such as JavaScript. A data encapsulation module could then automatically search for all input forms and encapsulate them in randomly generated JavaScript functions that must be executed by each client browser before the input form could be rendered. In another example, the admin user could designate all search requests to be critical source code, which should be encapsulated in a second computer source code language, such as VB Script. Another data encapsulation module could then automatically search for all search request and encapsulate them in randomly generated VB Script functions that must be executed by each client browser before the search request could be rendered.

In some embodiments, a data encapsulation module could be configured to randomly select the second computer programming language used by the system to encapsulate portions of the server device source code. In some embodiments, a data encapsulation module could be configured to randomly scramble the names of functions called by the client device. In some embodiments, a data encapsulation module could be configured to randomly translate the entire source code sent from server 710 into a different programming language, further hindering attempts to automatically scan and spoof client devices by dynamically altering the main programming language that proxy 705 uses to communicate with client device 715. While such changes would be transparent to a client browser configured to handle a plurality of different source codes, such changes would be difficult for most simple bots to understand. In some embodiments, a data encapsulation module could be configured to randomly switch the first programming language to translate the original server device code into, and/or the second programming language to encapsulate the critical source code with. In some embodiments, third, fourth, or even fifth programming languages could be used to encapsulate various critical information. For example, JavaScript could be used to encapsulate a first input form, while VB Script could be used to encapsulate a second input form.

Upon receiving client data from client device 715, the dynamic reputation module 730 is programmed to analyze the response from client device 715 to determine if any of the responses are ill-formed. For example, if an id of an input form has been scrambled in accordance with an algorithm, and the client device failed to unscramble the id, then the client data might contain an invalid id submitted from client device 715, and a bot might have either spoofed client device 715, or client device 715 might have been infected with a virus. In some embodiments, each data encapsulation module has its own rules (preferably at least partially defined by an admin user) set that determine what range of behaviors is considered normal and what range of behaviors is considered abnormal. The dynamic reputation module 730 is preferably programmed to then analyze the relevant client data using such rules and generate a result reputation for client device 715 after each request is sent from client device 715 that can be a score, a status, or a profile.

The dynamic reputation module 730 is programmed to then compile all the results generated by the data encapsulation modules and send the compiled results and the client data to the reputation assessment module 740 to assess the risk and reputation of the client device 715. If the client data includes responses that diverge greatly from the expected responses (the normal ranges), or if the client data contains too many or too few responses (e.g. a bot fails to find all of the input forms, or a bot incorrectly guesses that client device 715 is responding to an earlier input form, etc.), the reputation assessment module 740 is programmed to generate a reputation assessment for the client device 715.

In some embodiments, the proxy 705 is programmed to increase a malicious behavior indicator attributes in the risk profile associated with the client device 715 based on the reputation assessment, while in other embodiments the proxy 705 is programmed to throttle or completely cut off traffic between the client device 715 and the server device 710 based on the reputation assessment. In other embodiments, the proxy 705 is programmed to wait for a properly formed request, or send a transmission to the client device 715 to re-send the data, instead of throwing out the request.

Preferably, in some embodiments, the data encapsulation modules are configured to dynamically change the manner, period, and/or type of data encapsulation that is used on the server source code. In some embodiments, one or more of the data encapsulation modules 735 are programmed to alter the language that is used to encapsulate the critical source code every milliseconds or picoseconds, every minute, every 5 minutes, 10 minutes, 20 minutes, 30 minutes, 1 hour, two hours, etc. In other embodiments, one or more of the data encapsulation modules 735 is configured to alter the order of which programming language is used (e.g. during a first time period, JavaScript is used to encapsulate the first input form but VB Script is used to encapsulate the second form, and during a second time period VB Script is used to encapsulate the first input form and JavaScript is used to encapsulate the second input form).

Figure 8:
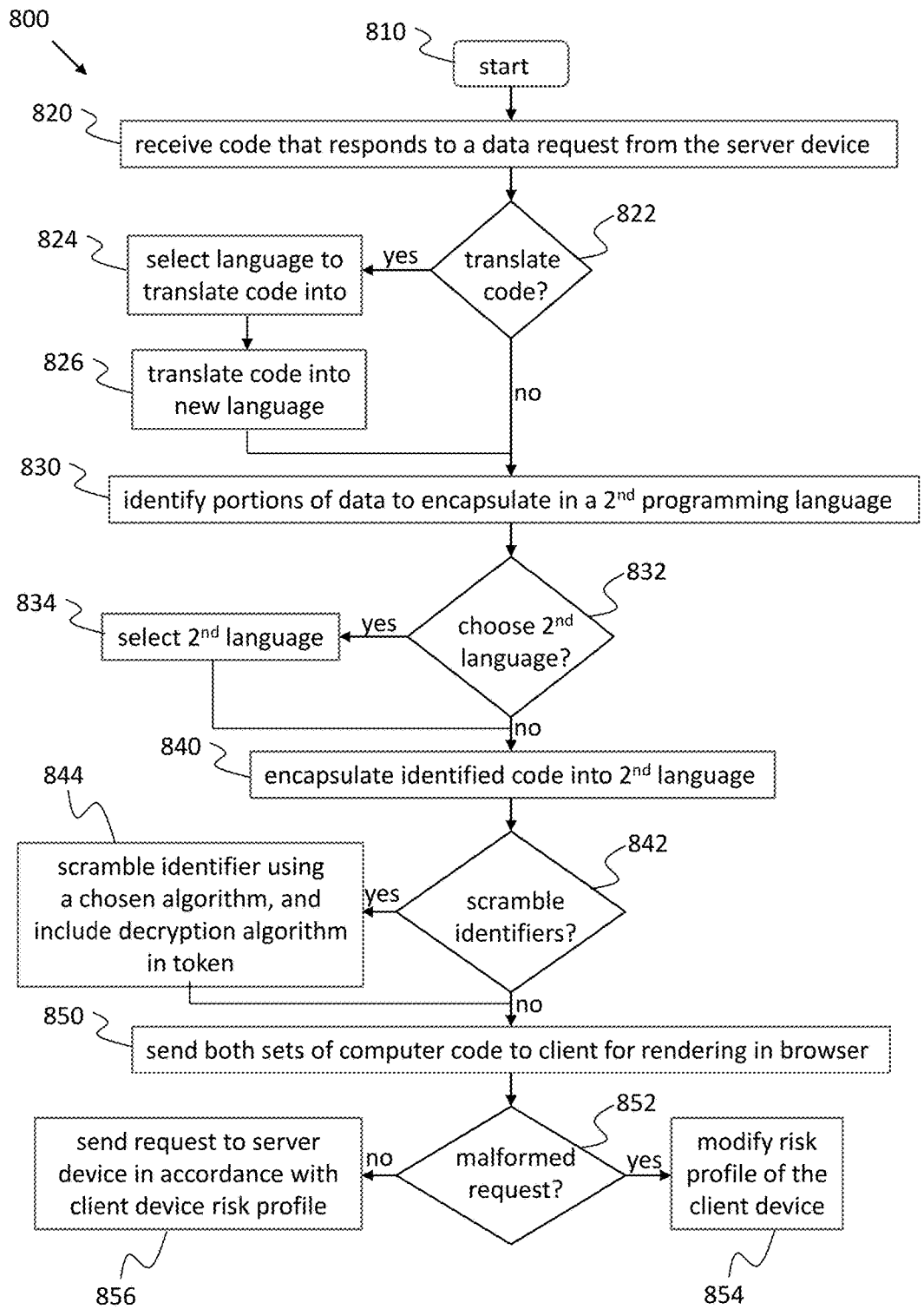
FIG. 8 illustrates a process to employ dynamic data encapsulation methods

Upon detecting such a pre-determined trigger, the dynamic reputation module 730 could be programmed to select a different set of data encapsulation modules from the data encapsulation modules 735 in the proxy 705. For example, after receiving source code from server 710 through server interface 725 and upon detecting a trigger, the dynamic reputation module 730 is programmed to select a second set of data encapsulation modules to encapsulate data from server device 710, wherein at least one of the second set of data encapsulation modules are different from the first set of data encapsulation modules. Preferably, the second set of data encapsulation modules and the first set of data encapsulation modules have very little overlap, and even more preferably, have no overlap FIG. 8 illustrates a process 800 of the dynamic reputation testing method of some embodiments. In some embodiments, the process 800 is performed by the proxy 705 that acts as the gatekeeper for all data and request directed at a server device (e.g., the server device 710). In step 810, the proxy waits to receive code from the server device to transmit to the client device. In step 820, the server device transmits code to the proxy device. Such code is usually sent in response to a data request from the client device, for example an HTTP get or a request for information, such as information specific to a client portal. In step 822, the proxy decides whether or not to translate the code into a different language than what was originally sent, for example transmitting code from Javascript to VBScript, or from HTML5 to AppleScript. In some embodiments, the proxy may be configured to first translate all of the code into a single universal code, such as HTML, before performing data encapsulation.

If the proxy is programmed to translate the code, the proxy selects the language for the code to be translated into in step 824, and then translates the code received by the server into the new language in step 826. Whether or not the proxy has translated the code, in step 830, the proxy analyzes the code received by the server to determine what portions to encapsulate. Any suitable algorithm could be used to identify portions of the code to encapsulate, for example the proxy could search for form requests or could search for metadata that indicates that a portion of the code should be secured. In some embodiments an administrator user defines the attributes of code that should be secured, and the proxy looks for those attributes to select portions of the code for encapsulation.

In step 832 the proxy determines whether it should choose the second language for encapsulation, or whether it should use a default second encapsulation language. If the proxy is programmed to select the second language, the proxy selects the second language in step 834. While the proxy could predictably select the second language based upon a system that takes turns, the proxy preferably selects the second language as a function of a randomizer that picks the second language at random. Whether or not the proxy picks the second language, the proxy will encapsulate the code identified for encapsulation in step 840.

Code that is encapsulated frequently has identifiers associated with it, such as function names (e.g. "Function 1," "Function 2" and "Function 3") or value names ("uid" "passw" "btnSubmit"). In step 842, the proxy determines whether it is programmed to scramble some or all of the identifiers, and will scramble identifiers in accordance to settings provided by an admin user. In some embodiments, the identifiers will be scrambled with one another, while in other embodiments the identifiers are scrambled using randomly chosen alphanumeric patterns. If the proxy is programmed to scramble identifiers, the proxy will scramble the identifier in step 844. A key to decipher the scrambled identifiers will typically be embedded in the token so that the proxy can decipher the scrambling when the client returns information associated with a scrambled identifier.

Whether or not the proxy has scrambled the identifiers, in step 850, the proxy sends both sets of computer code (the encapsulated and the non-encapsulated code) to the client for rendering in the client's browser, along with a token that can be used by the proxy to decipher a return request. While only two sets of computer code are shown in this method, more sets of computer code could be transmitted without departing from the scope of the invention. For example, the proxy could be configured to translate a portion of HTML5 code in to JavaScript, and a portion of the code within JavaScript to be translated into VBScript. In some embodiments, the proxy could randomly pick whether to use only one or two or more levels of code encapsulation as a function of a randomizer.

The proxy then waits for a request from the client device. After the proxy receives a request from the client device, in Step 852, the proxy decodes the request and determines whether the request is formed properly (decoded correctly by the client) or is malformed. If the request is not malformed, the request can be decoded by the proxy and could then be sent to the server in step 856. If the request is malformed, an alert could be transmitted in step 854 which modifies the risk profile of the client device so that appropriate devices and modules are informed and updated regarding which clients exhibit more risk behaviors.

Figure 9B:
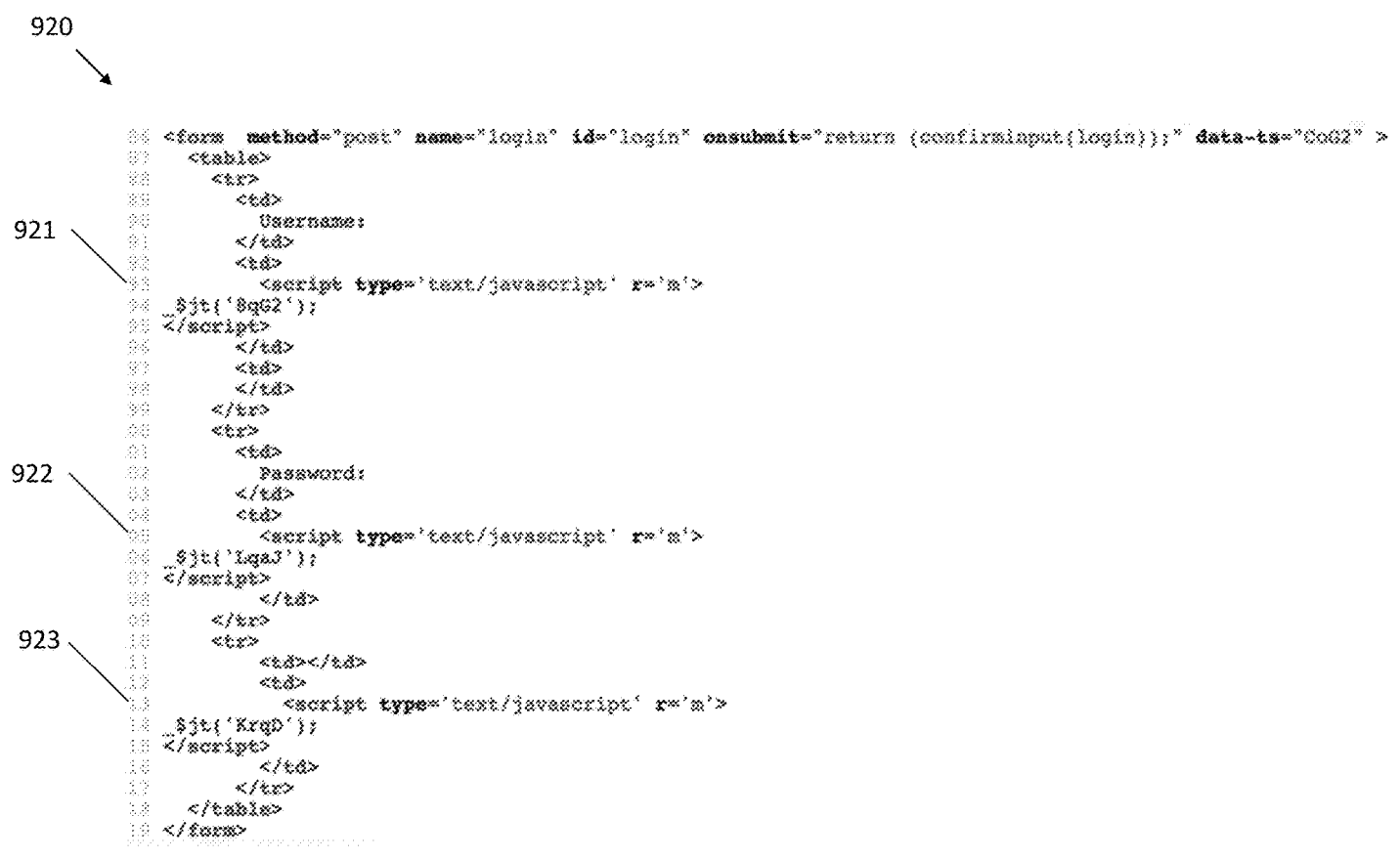
Figure 9C:
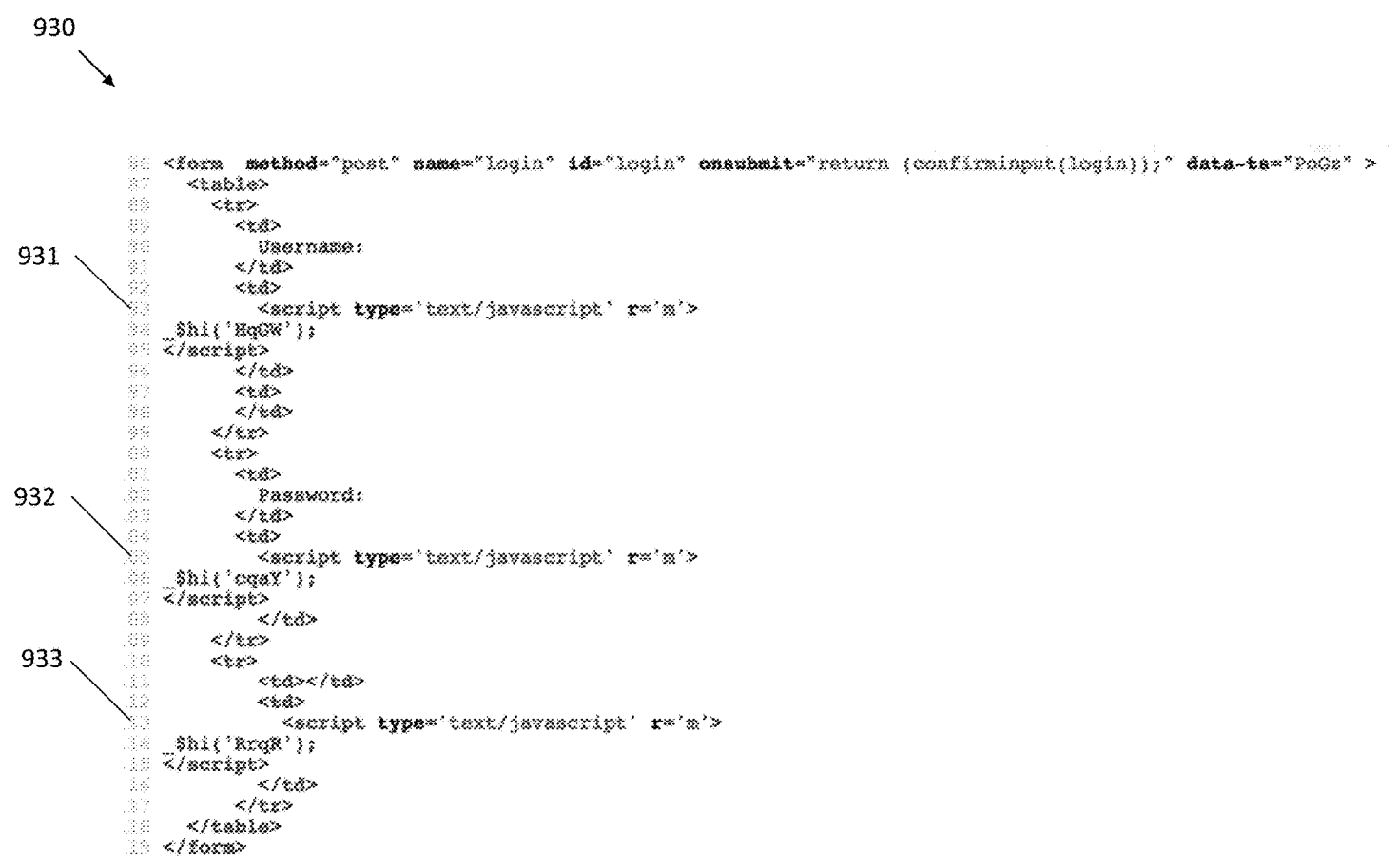

FIGS. 9A-9C show exemplary embodiments of HTML code in its raw format as sent by a server, and which has been hidden by a proxy using JavaScript code. FIG. 9A shows HTML code 910 that has been received by the proxy in response to a request that was forwarded by a client. The proxy then selects each of the input forms—input form 911, input form 912, and input form 913—for hiding. Typical malicious bots will scan input forms sent to clients, spoof the id names of the input forms, and send in their own code using those input forms. In the embodiment of FIG. 9B, the proxy has revised the HTML code and sent new HTML code 920 to the client. In this example, input form 911 has been hidden by a JavaScript function 921, input form 912 has been hidden by a JavaScript function 922, and input form 913 has been hidden by a JavaScript function 923. A malicious bot that scans input HTML code for input form data can no longer spoof the standard id, and instead must scan through the JavaScript code. In some embodiments, the id for input forms is scrambled within the JavaScript code itself, further encapsulating the input form id within yet another layer of security. In a new transmission to the client, shown as HTML code 930 in FIG. 9C, the proxy selects each of the same input forms—input form 911, input form 912, and input form 913—and hides those same input forms behind new JavaScript functions 931, 932, and 933, respectively. Thus, even if a malicious bot deciphers which JavaScript function to decode and spoof in a previous review of HTML code, the bot will not be able to decipher the JavaScript function to decode in a later sampling of HTML code, as the names of the JavaScript functions change over time.

While two computer codes in two different computer languages (JavaScript and HTML) are shown here, more or less computer codes could be used, with the same or different computer languages without departing from the scope of the current invention. For example, VBScript, PerlScript, or Dart could be used instead of JavaScript. In another embodiment, original JavaScript code sent by a server device could be embedded within a first JavaScript code, which is then embedded within a second JavaScript code or VBScript. In another embodiment, HTML4 code could be hidden within JavaScript code, which is then hidden within a CSS file. The obfuscating computer code could rearrange the original computer code sent by the server to the proxy, and the proxy could use a randomizer to select only certain portions of the original computer code to encapsulate while leaving other original computer code untouched. In preferred embodiments, the proxy could select only high priority original computer code to obfuscate, for example HTML form code (e.g. <input> tags), HTML link code (e.g. <a href> tags), or other attack entry points. In other embodiments, the proxy could be configured to obfuscate all of the data sent from the server device to the client device. An administrative user could select which types of computer code to obfuscate using a management console, such as management console 310 shown in FIG. 3.

The proxy preferably dynamically alters the names of functions, commands, and/or references in the obfuscating computer code over time. For example, in HTML code 920, the proxy could alter the names of the JavaScript functions in a first way at a first time, and then in HTML code 930, the proxy alters the names of the JavaScript functions in a second way at a second time. The proxy could be configured to alter the names of function calls used in every transmission to the client device, or could be configured to alter the names of the function calls after a threshold time has passed, or could be configured to alter the names of the function calls in response to another algorithm. In some embodiments, the system could alter the name of the function calls every time data is transmitted from the server device to the client device. In other embodiments, the system could keep the name of the function the same for a period of time, and will switch the name of the function after a threshold period of time has passed. Preferably, the function names are randomized and are different for every transmission.

Dynamic Sensor Detection

In some embodiments, the proxy could dynamically monitor and verify characteristics of the client device in order to determine that the client device is not exhibiting any behaviors of a malicious system and/or in order to determine that the proxy is continuously communicating with the same client device. If the characteristics of the client device change drastically from one communication to the next, the proxy could trigger an alert that indicates that the latest transmission from the client device has a high probability of being malicious.

Figure 10:
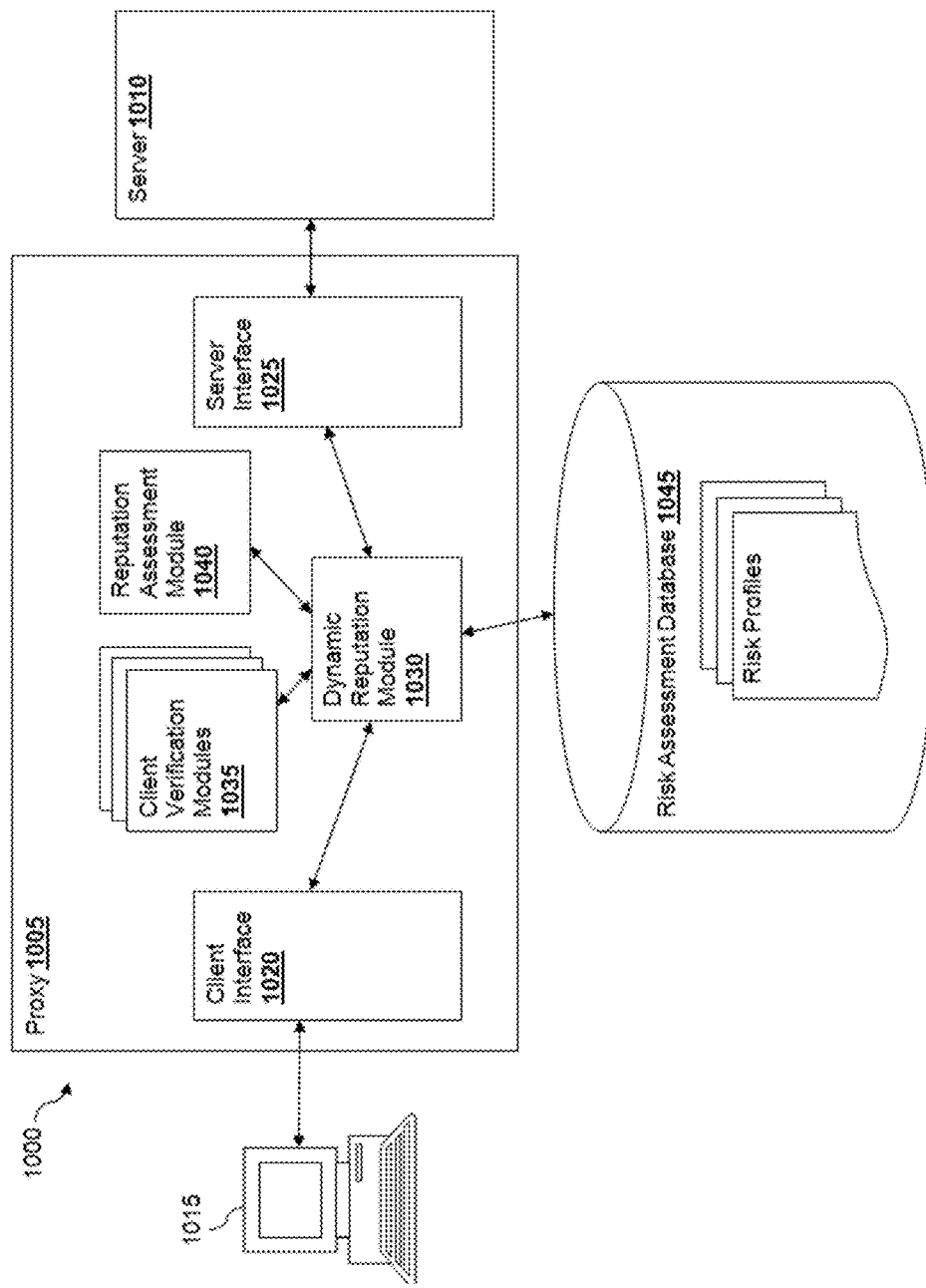
FIG. 10 shows an exemplary proxy configured to employ dynamic sensor detection methods.

FIG. 10 illustrates an environment 1000 in which a proxy 1005 can be operated. The environment 1000 includes the proxy 1005, a server device 1010, and a client device 1015. The proxy 1005 acts as a gateway for a server device 1010 against any traffic and communications between the server device 1010 and any client devices over a network (e.g., an intranet, the Internet, etc.). As such, the proxy 1005 is communicatively coupled with the client device 1015 that desires to exchange data with the server 1010.

The proxy 1005 includes a client interface 1020 for communication with the client device 1015, a server interface 1025, a dynamic reputation module 1030, multiple client verification modules 1035, and a reputation assessment module 1040. The proxy 1005 is communicatively coupled with the client device 515 and the server 510 either locally or over a network (e.g., an intranet, the Internet, etc.). Additionally, the proxy 505 is also communicatively coupled with a risk assessment database 545.

In some embodiments, the risk assessment database 1045 stores information associated with different client devices, such as identifiers that can uniquely identify the client devices, and risk profiles associated with the client devices. For example, the risk assessment database 1045 could store an identifier for the client device 1015 and a risk profile associated with that client device 1015. Initially, before the proxy 1005 receives requests from any client devices, the risk assessment database 1045 could be empty. As client devices, such as the client device 1015, begins to make requests to the server 1010 via the proxy 1005, the proxy 1005 slowly builds up different risk profiles for different client devices, that could be used to determine security measures against these client devices.

As mentioned above, the proxy 1005 includes multiple client verification modules 1035. Each of these client verification modules 1035 (e.g., client verification module 1035a, client verification module 1035b, etc.) corresponds to a different client characteristic from a list of client characteristics that the proxy 1005 is interested in. Contemplated client characteristics include an application runtime environment, application plugins to the client application, the state of the application runtime environment, the state of application plugins to the client application, malicious code inserted into a response, a modification of webpage variables, an encryption of webpage variables, and the patterns of input user interfaces of the client device (e.g. keyboard inputs, mouse inputs, video camera inputs).

Each of these client verification modules 1035 is programmed to verify the corresponding client characteristic against a client device (e.g., the client device 1015). In some embodiments, when the client device 1015 initiates a communication (e.g., sending a request for data) with the server device 1010, the proxy 1005 is programmed to select a set of client characteristics from this list of client characteristics to test against the client device 1015. In some of these embodiments, the proxy 1005 is programmed to send to the client device 1015 a small software program (e.g., a plug-in, an applet, etc.) that is used to be the liaison in the communication with the proxy 1005 when the client device 1015 initiates a communicate with the server 1010 and triggers establishment of a new session between the client device 1015 and the server device 1010. The small software program is installed at the client device 1015 (e.g., in the browser of the client device 1015, etc.) and is programmed to retrieve different types of information at the client device 1015 based on commands sent to the small program by the proxy 1005.

As the client device 1015 continues to communicates with the server device 1010 via the proxy 1005, the proxy 1005 is programmed to use different sets of client verification modules 1035, from time to time during the communication session between the client device 1015 and the server device 1010, to send different sets of commands to the client device 1015 such that the small program installed on the client device 1015 would retrieves client data based on the set of commands. The sets of commands correspond to client characteristics associated with the set of client verification modules 1035.

Contemplated commands include validation codes that, when executed by the small program on the client device 1015, collects runtime environment data from the client device 1015, collects plugin status from the client device, collects external device data on the client device 1015, collects plugin external device data on the client device 1015, collects client application data on the client device 1015 (e.g. changed webpage variables) or collects user interface input data on the client device 1015 (e.g. keyboard input data, mouse input data, trackball input data, camera input data). The proxy 1005 is programmed to trigger commands to run on the client device to collect some or all of the aforementioned data—typically depending upon the set of characteristics selected. The proxy 1005 then triggers an alert if the test results of the test characteristics diverge unexpectedly from the expected results.

Thus, after receiving the first communication (e.g., a request for data) from the client 1015 via the client interface 1020, the dynamic reputation module 1010 is programmed to forward the request to the server 1010 via the server interface 1025. Typically, the server device 1010 returns data in response to the first communication to the proxy 1005. The dynamic reputation module 1030 is programmed to select a first set of client verification modules from the client verification modules 1035 in the proxy 1005 for testing the client device 1015. As mentioned above, the dynamic reputation module 1030 is programmed to randomly select the first set of client verification modules by using a randomizer. In some embodiments, the randomizer could use a plurality of random sources to seed its randomized selection module. The randomizer could alter not only the number of test characteristics to test, but which test characteristics should be tested during the transmission. The set of test characteristics could change from transmission to transmission, or the proxy 1005 of some embodiments is programmed to re-select the first set of test characteristics when a threshold period of time has elapsed.

Once selected, the first set of client verification modules is programmed to send a first set of commands related to the client characteristics that correspond to the first set of client verification modules to the client device 1015. The small program installed on the client device 1015 is programmed to retrieve client data from the client device 1015 according to the first set of commands.

Depending on the commands, the small program is programmed to detect one or more of the following characteristics of the client device 1015: an application runtime environment, application plug-ins to the client application, the state of the application runtime environment, the state of application plug-ins to the client application, malicious code inserted into a response, a modification of webpage variables, an encryption of webpage variables, and patterns of input user interfaces of the client device (e.g. keyboard inputs, mouse inputs, video camera inputs).

After retrieving the client data that is relevant to the first set of commands, the small program is programmed to send the client data back to the proxy 1005. In some embodiments, the small program is programmed to embed the client data in an encrypted token, and send the encrypted token along with the subsequent communication the client device 1015 has with the server device 1010.

Upon receiving the client data, the dynamic reputation module 1030 is programmed to use the first set of client verification modules to verify the client data. In some embodiments, each client verification module has its own rules set that determine what range of behaviors is considered normal and what range of behaviors is considered abnormal. Each client verification module in the first set of client verification modules is programmed to then analyze the relevant client data and generates a result that can be a score, a status, or a profile.

The dynamic reputation module 1030 is programmed to then compile all the results generated by the first set of client verification modules and send the compiled results and the client data to the reputation assessment module 1040 to assess the risk and reputation of the client device 1015. If the client data includes test characteristics that diverge greatly from the expected test characteristic results (the normal ranges), or if the client data contains too many or too few test characteristic results (e.g. the client data includes keyboard input data when no keyboard input data was requested by the first set of client verification modules, or the transmission fails to send web browser runtime environment data when web browser runtime environment data was requested, etc.), the reputation assessment module 1040 is programmed to generate a reputation assessment for the client device 1015.

In some embodiments, the proxy 1005 is programmed to increase a malicious behavior indicator attributes in the risk profile associated with the client device 1015 based on the reputation assessment, while in other embodiments the proxy 1005 is programmed to throttle or completely cut off traffic between the client device 1015 and the server device 1010 based on the reputation assessment. In other embodiments, the proxy 1005 is programmed to wait for a properly formed request, or send a transmission to the client device 1015 to re-send the data, instead of throwing out the request.

Preferably, the dynamic reputation module 1030 is programmed to dynamically change the client characteristics that are tested against the client device 1015 over time (during the same session). In some embodiments, the dynamic reputation module 1030 is programmed to change the set of client characteristics that are tested against the client device 1015 by selecting a different set of client verification modules 1035. The change of client characteristics to test the client device 1015 can be triggered by one or more of many variables, including but not limited to, time (e.g., every milliseconds or picoseconds, every minute, every 5 minutes, 10 minutes, 20 minutes, 30 minutes, 1 hour, two hours, etc.) and a number of data transfers between the proxy 505 and the client device 515. For example, the dynamic reputation module 1030 of some embodiments is programmed to test the client device 1015 using different client characteristics every five seconds and/or every single data transfer (or every two data transfers, every three data transfers, etc.) between the proxy 1005 and the client device 1015.

Upon detecting such a pre-determined trigger, the dynamic reputation module 1030 is programmed to select a different set of client verification modules from the client verification modules 1035 in the proxy 1005. For example, after receiving the client data in response to the first set of commands and upon detecting a trigger, the dynamic reputation module 1030 is programmed to select a second set of client verification modules that is different from the first set of client verification modules. Preferably, the second set of client verification modules and the first set of client verification modules have very little overlap, and even more preferably, have no overlap. The second set of client verification modules is programmed to send a second set of commands to the client device 1015. In response, the small program at the client device 1015 is programmed to retrieve client characteristics data according to the second set of commands, embed the client characteristics data in the encrypted token, and send the encrypted token to the proxy 1005 (preferably along with the subsequent client request).

Once the dynamic reputation module 1030 receives the client characteristics data (by decrypting the encrypted token received from the client device 1015), the dynamic reputation module 1030 uses the second set of client verification modules to analyze the client data and generate results as described above. The dynamic reputation module 1030 is programmed to send the results and the client data to the reputation assessment module 1040 to assess the risk and reputation of the client device 1015.

It is contemplated that the execution time of retrieving the client data based on the commands is preferably measured to create a signature. The execution time can also be embedded in the encrypted token and sent back to the proxy 1005 by the small program. If the reputation assessment module 1040 detects that the execution time changes from one iteration to the next (deviating from the given signature), the system could trigger an alert that an entity is attempting to reverse engineer the client code. In some embodiments, the reputation assessment module 1040 is programmed to modify the risk profile of the client device 1015 based on this execution time variance information.

Over time, the proxy 1005 could generate a client profile for a client device 1015 based upon the test characteristics that have been selected. For example, the proxy 1005 is programmed to monitor how often a mouse and a keyboard have inputs that are transmitted, and the quality of such inputs. The client profile could be monitored in several ways in order to determine if a client device 1015 transmission is indicative of malicious behavior. For example, if the proxy 1005 detects a large divergence in the way the client device 1015 receives inputs from its mouse and keyboard from a first transmission to a second transmission, an alert could be triggered that indicates that a malicious device is attempting to spoof the client. In another embodiment, if the proxy 1005 detects that the quality of the mouse and keyboard inputs are indicative of a machine (e.g. the mouse moves at a regular, constant speed around the screen that can only be replicated by a machine), then an alert could be triggered that indicates that the client device 515 itself is probably a malicious bot.

The proxy 1005 is programmed to save the historical characteristics of the client device 1015 to the risk assessment database 1045 to be compared with future characteristics of the client device 1015 and/or with other client devices. For example, if the client device 1015's future characteristics diverge above a specified threshold, then the proxy 1005 is programmed to trigger an alert that the client device 1015 has probably been compromised. Or, if the proxy 1005 determines that the client device 1015, throughout the transaction process, has been a malicious device as a function of having similar attributes to other malicious client devices (or by being manually flagged by a system administrator through a user interface), the historical characteristics of the client device 1015 could be tagged as known blacklist characteristics.

Figure 11:
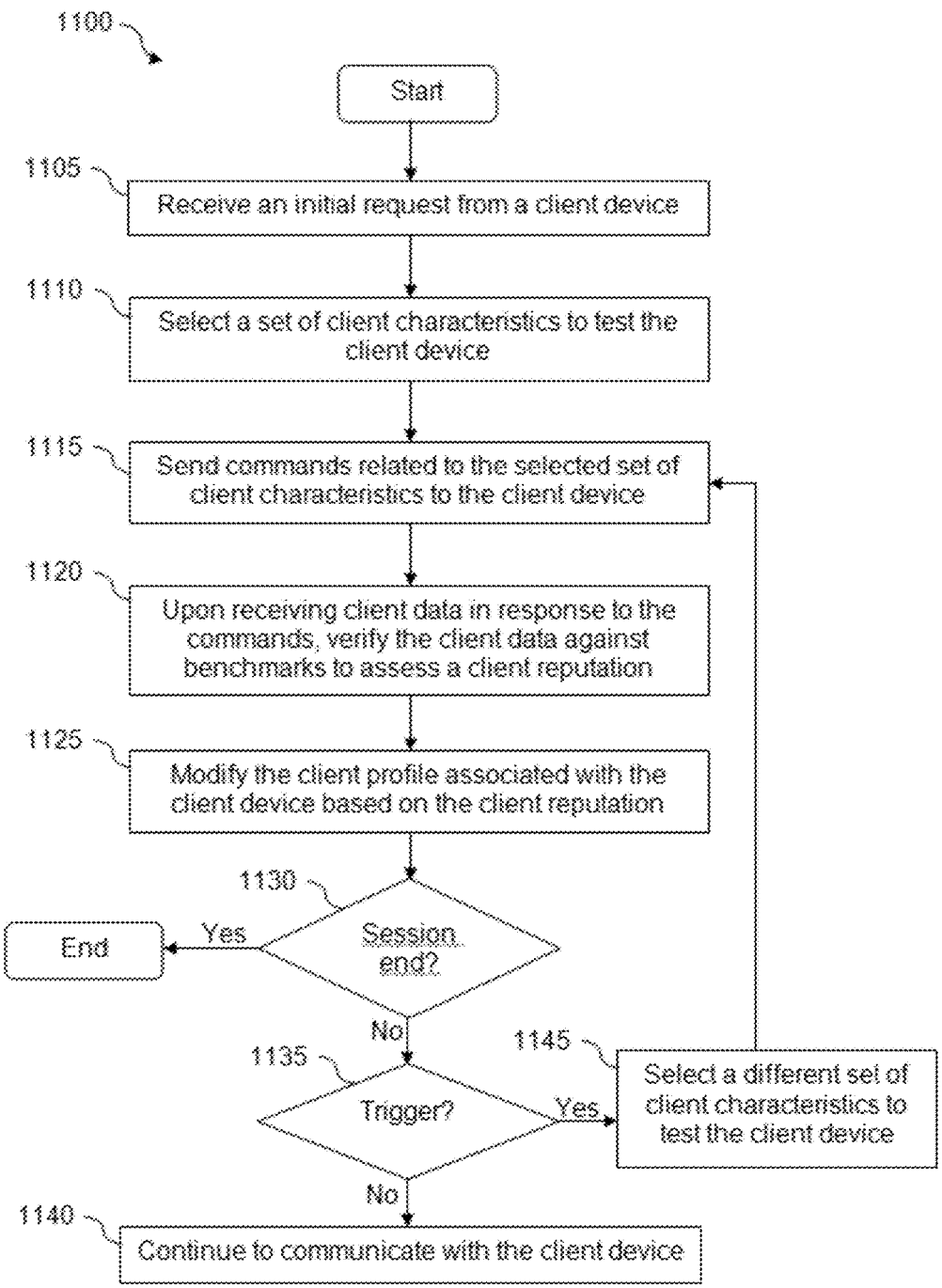
FIG. 11 illustrates a process to employ dynamic sensor detection methods.

FIG. 11 illustrates a process 1100 of the dynamic reputation testing method of some embodiments. In some embodiments, the process 1100 is performed by the proxy 1005 that acts as the gatekeeper for all data and request directed at a server device (e.g., the server device 1010). The process 1100 begins by receiving (at step 1105) an initial request from a client device (e.g., the client device 1015). The initial request is a request for data directed at the server device 1010.

The process 1100 then selects (at step 1110) selects a set of client characteristics to test the client device 1015, and sends (at step 1115) commands related to the selected set of client characteristics to the client device 1015. As mentioned above, the commands can be executed by the small program installed on the client device 1015 to poll/retrieve client data associated with the set of client characteristics. Once the client data is retrieved, the small program is programmed to embed the client data in an encrypted token and send the encrypted token back to the proxy 1005 along with a subsequent communication by the client device 1015 to the server 1010.

Upon receiving the client data in response to the commands, the process 1100 verifies (at step 1120) the client data against predetermined benchmarks to assess a client reputation for the client device 1015. The process 1100 then modifies (at step 1125) the client profile associated with the client device based on the client reputation.

After modifying the client profile, the process 1100 determines (at step 1130) if the session ends. The process 1100 can determine this based on a number of factors, such as idling time, whether the client device 1015 terminates a session, or the risk profile of the client device determines that the proxy 1005 should terminate the session. If it is determined that the session is terminated, the process 1100 ends. On the other hand, if it is determined that the session is not terminated yet, the process 1100 then determines (at step 1135) whether a change of client characteristics test is triggered. As mentioned above the change of client characteristics to test the client device 1015 can be triggered by time or number of data transfer between the proxy 1005 and the client device 1015. If it is determined that a change is not triggered, the process 1100 continues to communication (at step 1140) with the client device 1015, and goes back to step 1135 to determine whether a change of client characteristics test is triggered.

On the other hand, if it is determined that a change of client characteristics to test the client device 1015 is triggered, the process 1100 selects (at step 645) a new set of client characteristics to test the client device 1015. Preferable the new set of client characteristics is different from the previous set of client characteristics—preferably with little overlap and even more preferably with no overlap. Not only the characteristics can be different, but the number of client characteristics to be tested against the client device 1015 can be different as well. The process 1100 then reverts back to step 1115 to send command related to this new set of client characteristics to the client device 1015.

Dynamic Forensic

In some embodiments, the proxy device could reference data/behavior from a database containing a set of data/behaviors of other client devices. One set of data in the database could contain the initial data and behavior where company/user would feed to proxy. A second set of data in the database could be gathered from information collected from a dynamic sensor module, to enrich the existing client data and behavior.

The proxy could use the initial behavior data fed by company/user, which in-terms, becomes rules/policies to verify data and behavior through the dynamic sensor module collected from client device in real-time. For an example, if a particular user logged in from a China location and then logged in again from a United States location (e.g. identified by analyzing the IP address), that could violate a geographic policy where user cannot be present in different locations in short amount of time. Information gathered from the dynamic sensor module is preferably stored in the database.

While a proxy checks client behavior with existing policies, at the same time, the proxy could be configured to also pull historical client data and behavior from the database, and perform further analysis and see there are any suspicious and if new policies will need to be added real-time checklist. In some embodiments, a client profile and/or reputation is generated by the system as a function of past result sets of polled characteristics from the client device. For example where some characteristics improve the reputation of the client device and other characteristics decrease the reputation of the client device, the client device's reputation could be derived as an average of those analyzed characteristics. In some embodiments, the proxy checks client behavior against a database containing historical data of known risky characteristics, and compares the results of the received set of test characteristics against the known risky characteristics to determine if an alert should be triggered. Typically, a comparison against a known signature is performed to detect such anomalies.

Dynamic Throttling

In some embodiments, the proxy device could be configured to cut off, limit, or throttle access of the client device to the server device. For example, if an alert is triggered that malicious behavior is detected, or a reputation of a client device falls below a threshold, the proxy device could be configured to throttle access of the client device to the server device. Likewise, if the system detects that an alert has not been triggered in a threshold period of time, or that the reputation of the client device raises above a threshold, the proxy device could be configured to increase access of the client device to the server device. In some embodiments, multiple "throttle buckets" could be configured, having a first bandwidth for a low reputation (e.g. less than −20) a second bandwidth for a neutral reputation (e.g. between and including −20 and +20) and a third bandwidth for a high reputation (e.g. more than +20). The system could be configured to associate a client device with certain bandwidth buckets as a function of the client's profile and/or reputation value. Client fingerprint information, the ability of a client to return properly encrypted tokens, or the ability for a client to pass or fail certain tests can determine how much access a client device has to the server device.

Dynamic Reputation

In some embodiments, the proxy device could perform randomized tests on the client device over time to modify the reputation level of the client device. By randomizing the tests, the system would make it difficult for an attacker to predict which test will be administered, and react accordingly. Preferably, the system has a large bank of tests to perform, for example analyzing the client device's characteristics, sending verification data (e.g. a token) at one time and requesting the verification data at another time, sending a first encryption algorithm at a first time and requesting that data be encrypted using that encryption algorithm at a second time, and many of the other aforementioned tests.

The client device could perform the test and send result test data, and depending upon the result test data, the system could then modify a reputation value of the client device.

Preferably, for virgin systems that have contacted the proxy for the first time, the proxy assigns a default reputation value to the client device, for example 0 for a system with reputation values ranging from −50 to +50 or 50 for a system with reputation values ranging from 0 to 100. In other embodiments, the proxy could determine a client identifier of the client device, for example by polling the client device's IP or MAC address, or by polling characteristics of the client device and generating a unique client fingerprint from those characteristics. Using that client identifier, the proxy could look up the client device in a historical database to determine if the system, or any other system, has assigned a reputation value for that client device, and assign that reputation value to the client device initially. In other embodiments, the system could generate a client profile, and compare that client profile against a historical database of client profiles to determine what default reputation value should be assigned to client devices of that client profile. (e.g. all client devices within a specific subnet or that initially access a certain portion of the server device should be assigned a predetermined default reputation value)

As the system polls the client device with randomized test, the client device could fail some tests and pass other tests. The system could then increment the client device's reputation value when the client device passes a test, or could decrement the client device's reputation value when the client device fails a test. The tests could be weighted, such that some tests increment/decrement the reputation value more than others, and the tests could have different weights for a pass than a fail, such that a test decrements the reputation value when a pass has been detected by a greater amount than the system increments the reputation value when a fail has been detected.

Data Packets

Figure 12:
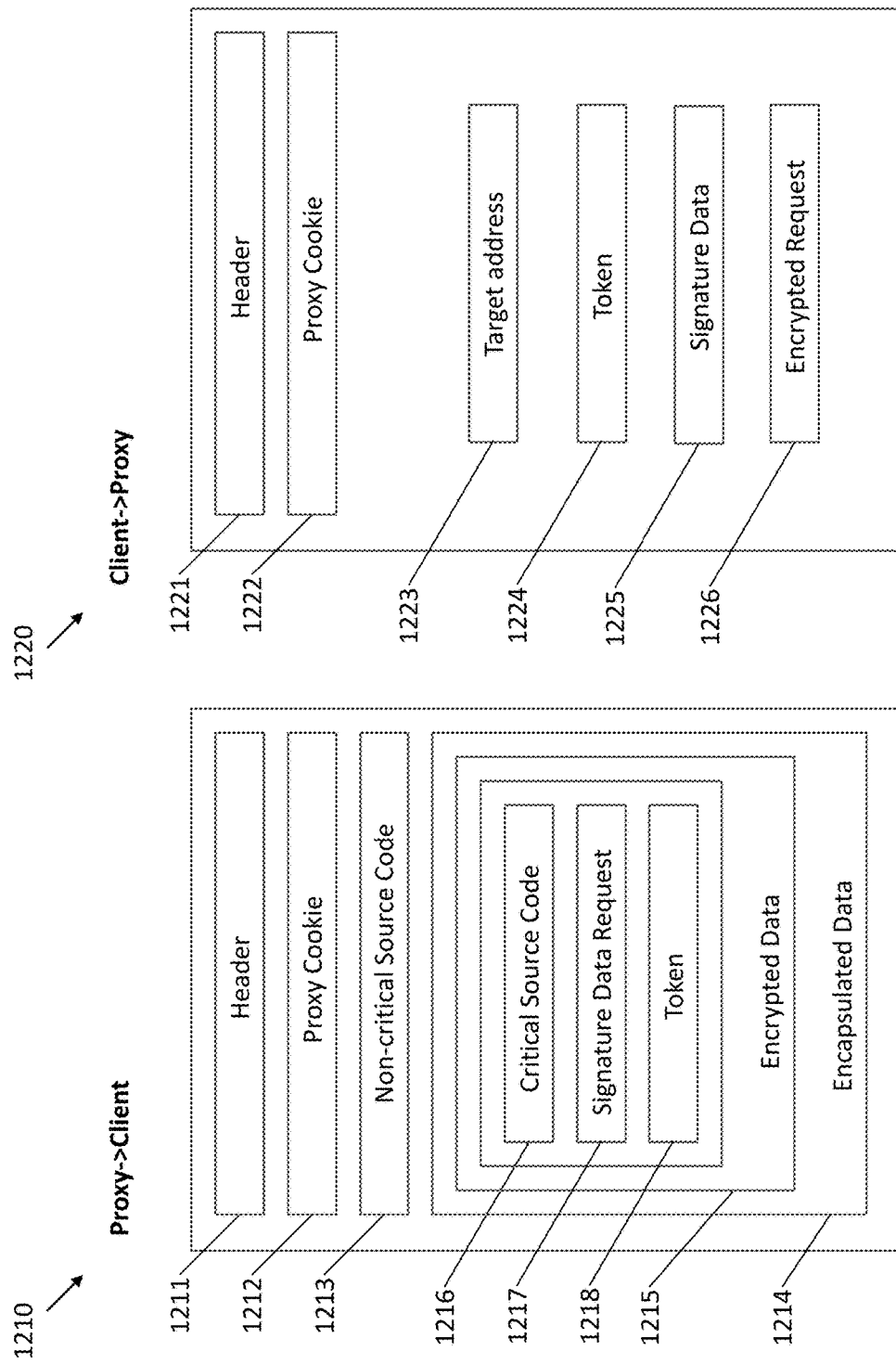
FIG. 12 shows an exemplary software schematic of the data packets exchanged between the proxy and the client device.

FIG. 12 shows exemplary data packets that could be sent from the proxy to the client and from the client to the proxy.

Data packet 1210 illustrates the architecture of an exemplary packet that could be sent from a proxy device to a client device. Data packet 1210 comprises a header 1211, a proxy cookie 1212, non-critical source code 1213, encapsulated data 1214, which contains encrypted data 1215, which contains critical source code 1216, a client signature data request 1217, and token 1218. Header 1211 could be a standard packet header containing a target IP address, routing information, checksum information, and so on, which could vary depending upon the hardware and software architecture used to transmit data packets from one computer device to another computer device over the network. Proxy cookie 1212 comprises a cookie that is sent to the client browser to be saved on the client device, and could be used to identify certain attributes of the client and/or attributes of the client's session with the proxy device. Non-critical source code 1213 is source code that is unencrypted and/or unencapsulated, sent to be rendered by the client browser in a first programming language, such as HTML, which is compiled by a first client-side compiler to be rendered in the client browser. Encapsulated data 1214 is source code that is encapsulated in a second programming language, such as JavaScript or VB Script, which is compiled by a second client-side compiler to be rendered in the client browser.

Encapsulated data 1214 could be configured to contain encrypted data 1215, which is encrypted using the last known encryption algorithm that was sent to the client by the proxy. As such, the initial communication from the proxy to the client needs to be sent unencrypted before the proxy could then transmit encrypted data to the client. Within encrypted data 1215, the proxy could send critical source code 1216, client signature data request 1217, and token 1218. Critical source code 1216 contains portions of the browser source code sent from the server device which the proxy has deemed to be "critical" and in need of extra security measures, so has been encrypted and encapsulated before being sent to the client, signature data request 1217 contains a data request from the proxy to ask for selected signature data of the client to be verified, such as commands related to client characteristics, or client-side programs configured to mine client characteristic data and send such data back to the proxy in a response package. Token 1218 typically contains session information, such as client identity, the encryption algorithm used, the type of encapsulated data used, a key that maps raw critical data to encrypted or scrambled critical data, or other information that the proxy may need later to interpret whether the response from the client is genuine.

While data packet 1210 from the proxy to the client is shown to have the architecture described above, data packet 1210 could have more or less components as shown without departing from the scope of the current invention. For example, data packet 1210 could have encapsulated data, but no encrypted data, or could have encrypted data, but no encapsulated data. In some embodiments, the data packet might not have a signature data request, or could transmit the token outside of the encrypted area, but within the encapsulated area. Some signature data requests could be sent with the non-critical source code outside of the encapsulated data, while other signature data requests could be saved within the encrypted data.

Data Packet 1220 comprises a header 1221, a proxy cookie 1222, a target address 1223, a token 1224, signature data 1225, and encrypted request 1226. As with data packet 1210, header 1221 could be a standard packet header containing a target IP address, routing information, checksum information, and so on, which could vary depending upon the hardware and software architecture used to transmit data packets from one computer device to another computer device over the network. Likewise, proxy cookie 1212 could comprise a copy or a subset copy of proxy cookie 1212, and could be used to identify certain attributes of the client and/or attributes of the client's session with the proxy device. Target address 1223 generally comprises the address indicative of the portion of the server device that the client device wishes to access. In some embodiments, target address 1223 points to an address server device, which the proxy intercepts, and in other embodiments target address 1223 points to an address on the proxy device itself, which then forwards a separate packet with a separate target address as a function of target address 1223.

Token 1224 could comprise the token 1218 that was sent from the proxy to the client, or could comprise a token that was compiled by the client that contains private session information to be decoded and read by the proxy. Signature data 1225 comprises client characteristics that were mined from the client device, and which are sent to the proxy to verify whether or not the client device has a good reputation. Encrypted request 1226 comprises a request containing data that is sent to the server device, which can then be decrypted by the proxy, typically be using a decryption key contained within token 1224.

Like data packet 1210, data packet 1220 could have more, less, or a different architectural configuration than the configuration shown without departing from the scope of the invention.

Alternative Proxy Architectures

Figure 13:
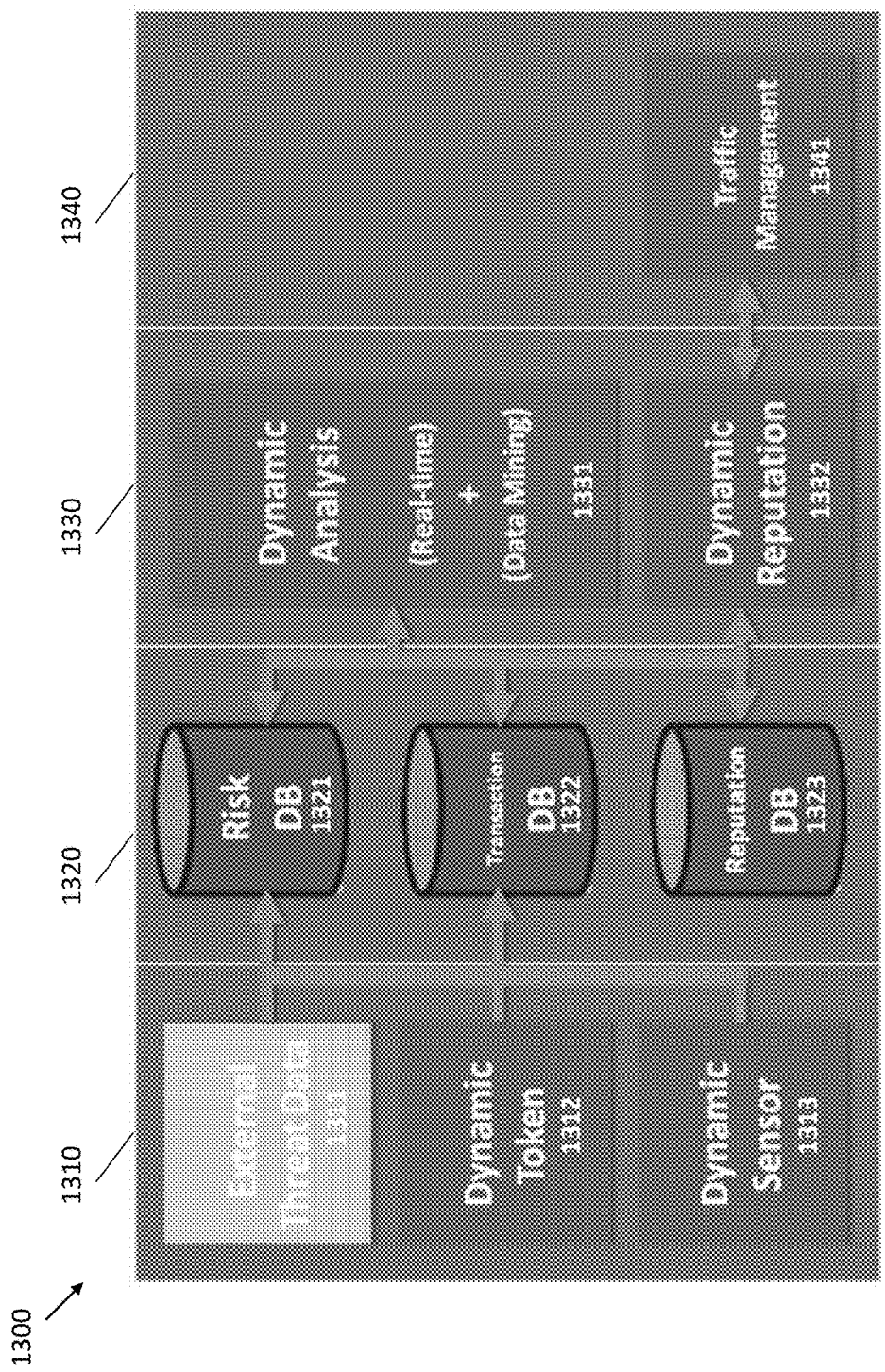
FIG. 13 shows an exemplary software schematic of multiple engines that analyze high risk threat data of a client device.

FIG. 13 shows an exemplary schematic of a module 1300 that dynamically analyzes data from one or more client devices. The system is generally divided into data collection modules 1310, database modules 1320, analysis modules 1330, and traffic management modules 1340.

With data collection modules 1310, the system collects data from a plurality of sources, for example external threat data 1311, dynamic tokens 1312 received from the client device, and dynamic sensor information 1313 received from the client device or from sensors that poll data from the client device.

External threat data could be attacks that are detected by the proxy that originate from the client device (e.g. a DDoS attack, an uploaded virus, or a failed test case scenario) or could be data on attacks from other devices (e.g. attacks from other client devices or data collected by a monitoring service that provides historical information on known malicious devices on an intranet or the Internet). Dynamic tokens could be tokens from client devices that are received by the proxy and are analyzed to determine whether the client device responded sufficiently to various tests and instructions provided to the client device by the proxy. Dynamic sensor data comprises client device data received by the proxy about the client device.

Historical and current records could be saved within database modules 1320, which houses one or more databases having sensor information that needs to be tracked to monitor various clients communicating with proxy 1300. Proxy 1300 will typically record aspects of each transaction in transaction database 1322, including token information and sensor information. For example, a token could indicate the polled characteristics that were requested from the client device. Proxy 1300 could then examine the token, decrypt the token, and determine which characteristics were polled using dynamic analysis module 1331, and record that information in transaction database 1322. The characteristics that were transmitted to proxy 1300 by the client device could also be saved in transaction database 1322. Proxy 1300 could also utilize dynamic analysis module 1331 to analyze data from transaction database 1322 to determine whether the client device exhibits malicious behavior recorded in risk database 1321, for instance if the client device returns different characteristics from the characteristics that were polled, if the client device failed to encrypt its sent data with a selected algorithm, or if the client device characteristics exhibit characteristics of a bot. If dynamic analysis module 1331 detects behavior that is malicious, it could transmit that information to dynamic reputation module 1332, which could then modify the reputation of the client device, and save that reputation in reputation database 1323. Traffic management module 1341 could then select the bandwidth that is determined for the client device when the client device communicates with the server device. For example, traffic management module 1341 could select a high bandwidth for a client device with a reputation below a first threshold amount, a low bandwidth for a client device for a client device with a reputation equal to or above the first threshold amount but below a second threshold amount, and could completely block traffic for a client device with a reputation equal to or above the second threshold amount.

Various objects, features, aspects and advantages of the inventive subject matter will become more apparent from the following detailed description of preferred embodiments, along with the accompanying drawing figures in which like numerals represent like components.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for encapsulating computer code, comprising a proxy device having a computer processor programmed to perform the following steps:
   receiving a first computer code that, when executed by a browser on a client device, presents a user interface to the browser;
   selecting a first portion of the first computer code to be hidden from the client device within a second computer code;
   generating a first function call of a second computer code as a function of a randomizer, wherein the browser executes a portion of the second computer code via the first function call to present the first portion of the first computer code to the browser for execution;
   transmitting the second computer code to the client device such that the second computer code and then the first computer code, are executed by the browser on the client device to present the user interface to the browser;
   initiating a timer;
   upon the timer reaching a threshold time, generating a second function call of the second computer code as a function of the randomizer,
   generating a third computer code, wherein the browser executes a portion of the third computer code via the second function call to present a part of the first portion of the first computer code to the browser for execution; and
   transmitting the third computer code to the client device such that the third computer code and then the first computer code, are executed by the browser on the client device to present the user interface to the browser.

2. The system of claim 1, wherein the first computer code comprises a segment of HTML link code.

3. The system of claim 1, wherein the second computer code comprises a segment of JavaScript code.

4. The system of claim 1, wherein the first computer code comprises a segment of HTML form code.

5. The system of claim 4, wherein the second computer code is configured to construct an encryption algorithm to encrypt inputs from the client device through the HTML form code.

6. The system of claim 5, wherein the encryption algorithm is split into a plurality of segments, the plurality of segments are transmitted to the client device along with the second computer code, and the second computer code is configured to construct the encryption algorithm from the plurality of segments.

7. The system of claim 1, wherein the step of selecting the first portion of the first computer code comprises selecting the first portion as a function of a randomizer.

8. The system of claim 7, wherein the computer processor of the proxy device is further programmed to perform the following steps:

initiating a timer;

upon the timer reaching a threshold time, selecting a second portion of the first computer code as a function of the randomizer, generating a third computer code that, when executed by the browser, presents the second portion of the first computer code to the browser for execution;

transmitting the third computer code to the client device such that the third computer code and then the first computer code, are executed by the browser on the client device to present the user interface to the browser.

\* \* \* \* \*